United States Patent
Li et al.

(10) Patent No.: US 10,382,158 B2
(45) Date of Patent: Aug. 13, 2019

(54) REVERSIBLE WAVELENGTH CHANNELS FOR OPTICAL COMMUNICATION NETWORKS

(71) Applicants: The Hong Kong Polytechnic University, Kowloon (HK); Versitech Limited, Hong Kong (HK)

(72) Inventors: Chun-yin Li, Kowloon (HK); Ping-Kong Alexander Wai, Kowloon (HK); Victor On-Kwok Li, Hong Kong (HK)

(73) Assignees: The Hong Kong Polytechnic University, Kowloon (HK); Versitech Limited, Hong Kong (HK)

( * ) Notice: Subject to any disclaimer, the term of this patent is extended or adjusted under 35 U.S.C. 154(b) by 0 days.

(21) Appl. No.: 14/873,047

(22) Filed: Oct. 1, 2015

(65) Prior Publication Data
US 2016/0036552 A1    Feb. 4, 2016

Related U.S. Application Data

(63) Continuation-in-part of application No. 14/045,258, filed on Oct. 3, 2013, now abandoned.

(51) Int. Cl.
*H04B 10/25* (2013.01)
*H04J 14/02* (2006.01)
*H04Q 11/00* (2006.01)

(52) U.S. Cl.
CPC ...... *H04J 14/0257* (2013.01); *H04B 10/2503* (2013.01); *H04J 14/0267* (2013.01);
(Continued)

(58) Field of Classification Search
CPC ............... H04J 14/0265; H04J 14/0215; H04J 14/0212; H04Q 11/0005; H04Q 11/0071;
(Continued)

(56) References Cited

U.S. PATENT DOCUMENTS 5,471,332 A    11/1995 Shiragaki et al.
5,740,289 A    4/1998 Glance
(Continued)

OTHER PUBLICATIONS

Berthold et al., "Optical Networking: Past, Present, and Future", Journal of Lightwave Technology vol. 26, No. 9, May 1, 2008, United States, pp. 1104-1118.
(Continued)

*Primary Examiner* — Leslie C Pascal
(74) *Attorney, Agent, or Firm* — Warner Norcross + Judd LLP

(57) ABSTRACT

An optical transmission system comprises at least one first connection point and one second connection point arranged to transmit and receive at least one channel signal transmitted via at least one optical means connecting the first connection point and the second connection, wherein each of the at least one channel signal is reversibly configurable to be transmitted in either a first direction or a second direction between the first connection point and the second connection point. A method of transmitting at least one channel signal between a first connection point and a second connection point via at least one optical media in an optical transmission system, wherein each of the at least one channel signal is reversibly configurable to be transmitted in either a first direction or a second direction between the first and the second connection points.

24 Claims, 14 Drawing Sheets

(52) U.S. Cl.
CPC .. *H04Q 11/0005* (2013.01); *H04Q 2011/0011* (2013.01); *H04Q 2011/0016* (2013.01); *H04Q 2011/0026* (2013.01)

(58) Field of Classification Search
CPC ...... H04Q 2011/003; H04Q 2011/0016; H04B 10/2503; H04B 10/802
USPC ..................................... 398/45–57, 178, 180
See application file for complete search history.

(56) References Cited

U.S. PATENT DOCUMENTS

| | | | |
|---|---|---|---|
| 5,805,320 | A | 9/1998 | Kuroyanagi et al. |
| 5,926,590 | A | 7/1999 | Mao |
| 5,973,809 | A | 10/1999 | Okayama |
| 5,978,120 | A | 11/1999 | Dumortier |
| 6,647,208 | B1 | 11/2003 | Kirby |
| 6,792,207 | B2 | 9/2004 | Iannone et al. |
| 7,058,302 | B2 | 6/2006 | Khalfallah et al. |
| 7,197,241 | B2 * | 3/2007 | Weston-Dawkes .......................... H04J 14/0284 398/12 |
| 7,613,391 | B2 * | 11/2009 | Tajima .................. G02B 6/3562 398/145 |
| 8,041,210 | B2 * | 10/2011 | Aronson .............. H04B 10/032 385/88 |
| 2004/0151493 | A1 | 8/2004 | Kim et al. |
| 2008/0019693 | A1 * | 1/2008 | Sorin ................. H04Q 11/0067 398/71 |
| 2008/0310859 | A1 | 12/2008 | Cai |
| 2013/0209105 | A1 * | 8/2013 | Jeong .................. H04J 14/0282 398/172 |
| 2015/0098477 | A1 | 4/2015 | Li et al. |

OTHER PUBLICATIONS

Bulow et al., "Calculation of the Noise Figure of Erbium-Doped Fiber Amplifiers using Small Signal Attenuations and Saturation Powers", IEEE Photonics Technology Letters vol. 4, No. 12, 1992, United States, pp. 1351-1354.
Chang et al., "Demonstration of Repeaterless Bidirectional Transmission of Multiple AM-VSB CATV Signals Over Conventional Single-Mode Fiber", IEEE Photonics Technology Letters vol. 12, No. 6, 2000, United States, pp. 734-736.
Chlamtac et al. "Lightpath Communications: An Approach to High Bandwidth Optical WAN's", IEEE Transactions on Communications vol. 40, No. 7, Jul. 1992, United States, pp. 1171-1182.
Delavaux et al., "WDM Repeaterless Bi-Directional Transmission of 73 Channels at 10 Gbit/s Over 126 km of True Wave Fiber", Proceedings of ECOC, 1997, Scotland, pp. 21-24.
Eiselt et al., "Field Trial of a 1250-km Private Optical Network Based on a Single-Fiber, Shared-Amplifier WDM System", Proceedings of NFOEC paper NThF3, 2006, United States, 6 pages.
Garrett et al., "Bidirectional ULH Transmission of 160-Gb/s Full-Duplex Capacity over 5000 km in a Fully Bidirectional Recirculating Loop", IEEE Photonics Technology Letters vol. 16, No. 7, 2004, United States, pp. 1757-1759.
Ghelfi et al., "Optical Cross Connects Architecture with Per-Node Add & Drop Functionality", Proceedings of NFOEC paper NTuC3, 2007, United States, 6 pages.
Gladisch et al., "Evolution of Terrestrial Optical System and Core Network Architecture", Proceedings of the IEEE vol. 94, No. 5, May 2006, United States, pp. 869-891.
Ho et al., "Performance of an Eight-Wavelength Bidirectional WDM Add/Drop Muitiplexer with 80-Gbit/s Capacity", Proceedings of OFC, 1997, United States, pp. 90-91.
Hu et al., "A Wavelength Selective Bidirectional Isolator for Access Optical Networks", Optical Fiber Technology vol. 17, 2011, United States, pp. 191-195.
Islam, "Raman Amplifiers for Telecommunications", IEEE Journal of Selected Topics in Quantum Electronics vol. 8, No. 3, 2002, United States, pp. 548-559.
ITU-T G.694.1, "Spectral Grids for WDM Applications: DWDM Frequency Grid", Jun. 2002, United Nations, 12 pages.
Karasek et al., "Bidirectional Repeaterless Transmission of 8 × 10 GE over 210 km of Standard Single Mode Fibre", IET Optoelectronics vol. 1, No. 2, 2007, United Kingdom, pp. 96-100.
Kelly, "Blocking Probabilities in Large Circuit-Switched Networks", Advances in Applied Probability vol. 18, 1986, United Kingdom, pp. 473-505.
Kim et al., "1100×1100 Port MEMS-Based Optical Crossconnect with 4-dB Maximum Loss", IEEE Photonics Technology Letters vol. 5, No. 11, 2003, United States, pp. 1537-1539.
Kim et al., "A Novel Bidirectional Add/Drop Amplifier (BADA)", IEEE Photonics Technology Letters vol. 10, No. 8, 1998, United States, pp. 1118-1120.
Kim et al., "Bidirectional WDM Self-Healing Ring Network Based on Simple Bidirectional Add/Drop Amplifier Modules", IEEE Photonics Technology Letters vol. 10, No. 9, 1998, United States, pp. 1340-1342.
Kim et al., "Independently Switchable Bidirectional Optical Cross Connects", IEEE Photonics Technology Letters vol. 12, No. 6, 2000, United States, pp. 693-695.
Kim, "Bidirectional Optical Cross Connects for Multiwavelength Ring Networks using Single Arrayed Waveguide Grating Router", Journal of Lightwave Technology vol. 20, No. 2, 2002, United States, pp. 188-194.
Laming et al., "Noise Characteristic of Erbium-Doped Fiber Amplifier Pumped at 980 nm", IEEE Photonics Technology Letters vol. 2, No. 6, 1990, United States, pp. 418-421.
Lee et al., "A Wavelength-Convertible Optical Network", Journal of Lightwave Technology vol. 11, No. 5, May/Jun. 1993, United States, pp. 962-970.
Lee et al., "Bidirectional Wavelength-Selective Optical Isolator" Electronics Letters vol. 37, No. 14, 2001, United Kingdom, pp. 910-912.
Li et al., "On Wavelength-Routed Networks with Reversible Wavelength Channels", Journal of Lightwave Technology vol. 31, Issue 9, May 1, 2013, United States, pp. 1-2.
Li et al., "On Wavelength-Routed Networks with Reversible Wavelength Channels", May 2013, http://dx.doi.org/10.1109/JLT.2013.2250481, pp. 1-9.
Liaw et al., "Bidirectional Reconfigurable Optical Add-Drop Multiplexer with Power Compensation Built-In Optical Amplifiers", Journal of Optical Networking vol. 7, No. 7, 2008, United States, pp. 662-672.
Liaw et al., "Multichannel Bidirectional Transmission using a WDM MUX/DMUX Pair and Unidirectional In-Line Amplifiers", IEEE Photonics Technology Letters vol. 9, No. 12, 1997, United States, pp. 1664-1666.
Liaw et al., "Power-Compensated 3 × 3 Reconfigurable Bidirectional Multiwavelength Cross-Connect Device Based on Strain Tunable Fiber Bragg Gratings", Preceedings of NOC paper CPI-6, 2011, England, pp. 103-106.
Lu et al., "A Bidirectional Hybrid DWDM System for CATV and OC-48 Trunking", IEEE Photonics Technology Letters vol. 13, No. 8, 2001, United States, pp. 902-904,
MacHale et al., "10Gb/s Bidirectional Transmission in a 116km Reach Hybrid DWDM-TDM PON", Proceedings of OFC paper OFE1, 2006, United States, 3 pages.
Maier et al., "On Dominant Characteristics of Residential Broadband Internet Traffic", Proceedings of the 9th ACM SIGCOMM Conference on Internet Measurement Conference, 2009, United States, 13 pages.
Park et al., "Bidirectional WDM Self-Healing Ring Network for Hub/Remote Nodes", IEEE Photonics Technology Letters vol. 15, No. 11, 2003, United States, pp. 1657-1659.
Paxson, "End-to-End Internet Packet Dynamics", IEEE/ACM Transactions on Networking vol. 7, No. 3, Jun. 1999, United States, pp. 277-292.

(56) References Cited

OTHER PUBLICATIONS

Poole et al., "Bandwidth-Flexible ROADM's as Network Elements", Proceedings of OFC, paper OTuE1, 2011, United States, 3 pages.

Shen et al., "A Novel Single-Fiber Bidirectional Optical Add/Drop Multiplexer for Distribution Networks", Proceedings of OFC paper WY5, 2001, United States, 3 pages.

Smart et al., "An Investigation of the Noise Figure and Conversion Efficiency of 0.98μm Pumped Erbium-Doped Fiber Amplifiers under Saturated Conditions", IEEE Photonics Technology Letters vol. 4, No. 11, 1992, United States, pp. 1261-1264.

Sun et al., "A Single-Fiber Bi-Directional WDM Self-Healing Ring Network with Bi-Directional OADM for Metro-Access Applications", Journal on Selected Areas in Communications vol. 25, No. 4, 2007, United States, pp. 18-24.

Sygletos et al., "Technological Challenges on the Road Toward Transparent Networking", Journal of Optical Networking vol. 7, No. 4, 2008, United States, pp. 321-350.

Thompson et al., "Wide-Area Internet Traffic Patterns and Characteristics", IEEE Network No. 6, Dec. 1997, United States, pp. 10-23.

Tran et al., "A Bidirectional Optical Add-Drop Multiplexer with Gain using Multiport Circulators, Fiber Bragg Gratings, and a Single Unidirectional Optical Amplifier", IEEE Photonics Technology Letters vol. 17, No. 7, 2003, United States, pp. 975-977.

Van Deventer et al., "Bidirectional Transmission using an Erbium-Doped Fiber Amplifier without Optical Isolators", IEEE Photonics Technolgy Letters vol. 7, No. 11, 1995, United States, pp. 1372-1274.

Van Deventer, "Fundamentals of Bidirectional Transmission Over a Single Optical Fibre", Kluwer Academic, Boston, 1996, p. 170.

Wolshon et al., "NCHRP Synthesis 340—Convertible Roadways and Lanes: A Synthesis of Highway Practice", Transportation Research Board, National Research Council, 2004, United States, 103 pages.

Xin et al., "Dynamic Traffic Grooming in Optical Networks with Wavelength Conversion", IEEE Journal on Selected Areas in Communications vol. 25, No. 9, Dec. 2007, United States, pp. 50-57.

Yoo, "Optical Packet and Burst Switching Technologies for the Future Photonic Internet", Journal of Lightwave Technology vol. 24, No. 12, 2006, United States, pp. 4468-4492.

Yuan et al., "FBG-Based Bidirectional Optical Cross Connects for Bidirectional WDM Ring Networks", Journal of Lightwave Technology vol. 22, No. 12, 2004, United States, pp. 2710-2721.

\* cited by examiner

REVERSIBLE WAVELENGTH CHANNELS FOR OPTICAL COMMUNICATION NETWORKS

RELATED PATENT DATA

This application is a continuation-in-part of and claims priority to U.S. patent application Ser. No. 14/045,258 filed Oct. 3, 2013, titled "Reversible Wavelength Channels for Optical Communication Networks", the teachings of which are incorporated herein by reference.

FIELD OF THE INVENTION

The present invention relates to an optical communications network, and particularly but not exclusively, to wavelength-routed networks for transmitting data traffic such as internet traffic.

BACKGROUND OF THE INVENTION

Wavelength-routed (WR) networks are one of the important networking infrastructures to provide the required transmission bandwidth for the rapidly increasing Internet traffic. In WR networks, wavelength division multiplexing (WDM) divides the transmission bandwidth of optical fiber into many, if not hundreds of wavelength channels. Two users desiring communication can set up a lightpath connection by simply reserving a wavelength channel on each fiber link of the path between them. Traditionally, all wavelength channels have been allocated the same amount of bandwidth for simplifying and standardizing the implementation and deployment, e.g., the 100 GHz frequency (0.8 nm wavelength) spacing in ITU grids.

As transmission technologies advance, wavelength channels will often be under-utilized, i.e. channels are over-provisioned for normal user traffic. To have a better bandwidth utilization, efforts have been made on packing more low data traffic into a wavelength channel, using a smaller channel spacing such as 50 and 25 GHz, and more recently, using the variable bandwidth allocation of wavelength channels. While the importance of properly matching channel bandwidth to users' demand has been widely recognized, the mismatch between the ratio of the capacities (numbers of channels) deployed in the two transmission directions of a fiber link has been overlooked. For example, even though a new lightpath request is blocked because of no idle wavelength channel being free in a WR network at the required transmission direction, it is possible that some are available in the other transmission direction.

SUMMARY OF THE INVENTION

In accordance with a first aspect of the present invention, there is provided an optical transmission system including at least one first connection point and at least one second connection point arranged to transmit and receive at least one channel signal transmitted via at least one optical media connecting the first connection point and the second connection point, wherein each of the at least one channel signal is reversibly configurable to be transmitted in either a first direction or a second direction between the first connection point and the second connection point.

In accordance with a second aspect of the present invention, there is provided a method of transmitting at least one channel signal between a first connection point and a second connection point via at least one optical media in an optical transmission system, comprising the steps of multiplexing a plurality of input signals into at least one channel signal; transmitting the at least one channel signal via the at least one optical media; and demultiplexing the at least one channel signal into a plurality of output signals; wherein each of the at least one channel signal is reversibly configurable to be transmitted in either a first direction or a second direction between the first connection point and the second connection point.

The present invention allows the flexibility to fully utilize the deployed optical means, such as optical fiber network infrastructures to lessen the need for new fiber infrastructure deployments even if the traffic becomes dynamic, or if the traffic patterns have deviated greatly from the original design plan. In addition, the required technologies for implementing the present invention are available in the field, and there is no foreseeable technology bottleneck.

Accordingly, in a first aspect of the present invention, an optical transmission system contains a first connection point, and a second connection point connected to the first connection point via at least one optical media. The first connection point and the second connection point are arranged to transmit and receive a channel signal transmitted via at least one channel in the at least one optical media. The first connection point, the second connection point, and the at least one optical media are reversibly configurable. The at least one channel is adapted to be used for transmitting the channel signal both from the first connection point to the second connection point and vice versa.

Preferably, each of the first connection point and the second connection point contains a bidirectional multiplexing device for multiplexing a plurality of input signals into the channel signal which is a composite signal comprising components each corresponding to one the input signal.

More preferably, each of the first connection point and the second connection point includes a bidirectional demultiplexing device for demultiplexing the channel signal which is a composite signal into a plurality of output signals each of which corresponding to a component of the channel signal.

In a variation of the embodiment, the optical transmission system further contains a bidirectional optical isolator for limiting reflection of the channel signal.

Preferably, the bidirectional optical isolator further contains two isolator modules, each connected to the two ports of the bidirectional optical isolator by a switching device. The switching device configures one of the two isolator modules to be used at one time depending on a transmission direction of the channel signal.

In a variation of the embodiment, the at least one optical media contains a first optical media and a second optical media, and wherein the optical transmission system further comprises a bidirectional optical switch for switching transmission of the channel signal between the first optical media and the second optical media.

Preferably, the bidirectional optical switch is a micro electro mechanical systems (MEMS) switch containing a plurality of on-off mirrors.

In one implementation, the optical transmission system further contains a bidirectional optical amplifier for amplifying the channel signal.

Preferably, the bidirectional optical amplifier further contains a single-directional amplifier unit; a multiplexer with its output connected to an input of the single-directional amplifier unit; and a demultiplexer with its input connected to an output port of the single-directional amplifier unit. The input of the multiplexer and an output of the demultiplexer are connected to the bidirectional optical switch whereby the channel signal is adapted to be switched by the bidirectional optical switch to go through and be amplified by the single-directional amplifier unit.

In one implementation, the optical transmission system further comprises a bidirectional optical wavelength converter.

Preferably, the bidirectional optical wavelength converter further comprises a single-directional converter unit; an input and an output of the converter unit connected to the bidirectional optical switch whereby the channel signal is adapted to be switched by the bidirectional optical switch to go through and be converted by the single-directional converter unit.

In one variation, the at least one optical media is an optical fiber.

In another variation, the channel signal contains at least one wavelength channel.

In one implementation, the at least one optical media contains a first optical media and a second optical media, and wherein the optical transmission system further contains a bidirectional isolating means for limiting reflection of the channel signal, a bidirectional amplifying means for amplifying the channel signal, a bidirectional optical switch for switching transmission of the channel signal between the first optical media and the second optical media, and a bidirectional optical wavelength converter for converting the channel signal so that the channel signal is adapted to be transmitted by the at least one optical media. The at least one optical media contains at least one optical fiber, and the at least one channel signal comprises at least one wavelength channel.

In another aspect of the present invention, there is provided a method of transmitting at least one channel signal between a first connection point and a second connection point via at least one optical media in an optical transmission system. The method includes the steps of: multiplexing a plurality of input signals into a channel signal; transmitting the channel signal via at least one channel in the least one optical media; and demultiplexing the channel signal into a plurality of output signals. The first connection point, the second connection point, and the at least one optical media are reversibly configurable. The at least one channel is adapted to be used for transmitting the channel signal both from the first connection point to the second connection point and vice versa.

Preferably, the method further includes a step of limiting reflection of the channel signal by a bidirectional optical isolator after the multiplexing step.

More preferably, the bidirectional optical isolator further contains two isolator modules, each connected to the two ports of the bidirectional optical isolator by a switching device. The switching device configures one of the two isolator modules to be used at one time depending on a transmission direction of the channel signal.

In one variation of the embodiment, the method further contains a step of amplifying the channel signal by a bidirectional optical amplifier after the multiplexing step.

Preferably, the bidirectional optical amplifier further comprises: a single-directional amplifier unit; a multiplexer with its output connected to an input of the single-directional amplifier unit; and a demultiplexer with its input connected to an output port of the single-directional amplifier unit. An input of the multiplexer and an output of the demultiplexer are connected to the bidirectional optical switch whereby the at least one channel signal is adapted to be switched by the bidirectional optical switch to go through and be amplified by the single-directional amplifier unit.

In one variation of the embodiment, the at least one optical media comprises a first optical media and a second optical media. The method further contains a step of switching the channel signal between the first optical media and the second optical media by a bidirectional optical switch.

Preferably, the bidirectional optical switch is a micro electro mechanical systems (MEMS) switch containing a plurality of on-off mirrors.

In one variation of the embodiment, the method further contains a step of converting the channel signal by a bidirectional optical wavelength converter, so that the channel signal is adapted to be transmitted by the at least one optical media.

Preferably, the bidirectional optical waveform converter further contains a single-directional converter unit; an input and an output of the converter unit connected to the bidirectional optical switch whereby the at least one channel signal is adapted to be switched by the bidirectional optical switch to go through and be converted by the single-directional converter unit.

In one variation of the embodiment, the at least one optical media contains a first optical media and a second optical media. The method further contains the step of limiting reflection of the channel signal after the multiplexing step, amplifying the channel signal after the multiplexing step, switching the channel signal between the first optical media and the second optical media, and converting the channel signal so that the channel signal is adapted to be transmitted by the at least one optical media.

DETAILED DESCRIPTION OF THE PREFERRED EMBODIMENTS

Figure 1:
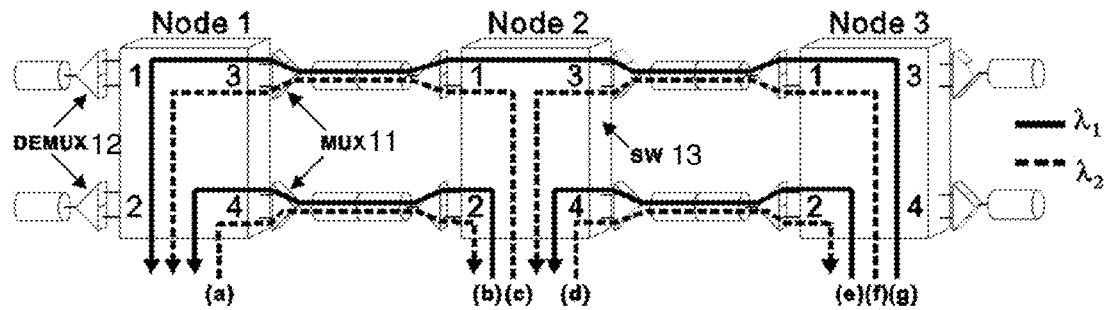
FIG. 1 shows three nodes of a WR network with the reversible wavelength channels in accordance with the present invention.

The present invention relates to an optical transmission system comprising at least one first connection point and at least one second connection point arranged to transmit and receive at least one channel signal transmitted via at least one optical media connecting the first connection point and the second connection point, wherein each of the at least one channel signal is reversibly configurable to be transmitted in either a first direction or a second direction between the first connection point and the second connection point.

The present invention also relates to a method of transmitting at least one channel signal between a first connection point and a second connection point via at least one optical media in an optical transmission system, comprising the steps of multiplexing a plurality of input signals into at least one channel signal, transmitting the at least one channel signal via the at least one optical media, and demultiplexing the at least one channel signal into a plurality of output signals, wherein each of the at least one channel signal is reversibly configurable to be transmitted in either a first direction or a second direction between the first connection point and the second connection point.

Specifically, the at least one channel signals includes at least one wavelength channel. The at least one optical media includes at least one optical fiber, and that the first direction and the second direction are opposite to each other.

Without wishing to be bound by theory, the inventors through trials, research and study are of the opinion that the present application has significant benefits over the current technology. As a starting point in the consideration of the usage of a reversible channel signal, and particularly, a wavelength channel for optical communication networks, the inventors have observed through study that the present invention has specific benefits. For example, in most deployed WR networking infrastructures, the links connecting two nodes are often assigned the same number of channels in both transmission directions. The assumption is that the volumes of traffic in both transmission directions of a link are often nearly equal. However, the inventors have recognized that in the real world, traffic between users are often not necessarily symmetric, not to mention the frequent changes of traffic patterns in today's networks. As the Internet becomes an increasingly important resource of information and entertainment, we are facing local and global networks with increasingly dynamic traffic patterns.

Although light beams raveling along a fiber optic cable are significantly different from material objects, the inventors have very surprisingly taken inspiration from objects in the physical world. The recognition that light is sometimes analogous to a physical object provides a comparison which can help to explain the invention. If we analogize optical fibers to roads, then the wavelength channels may be considered as lanes. In highway systems, reversible lanes have already been regarded as one of the most cost-effective methods to provide additional capacity for periodic unbalanced directional traffic demand while minimizing the total number of lanes on a roadway. Undoubtedly, the negative impact of asymmetric traffic distribution will be mitigated in WR networks if the transmission directions of all wavelength channels can be freely reversed according to the needs of the traffic condition, i.e., with reversible wavelength channels.

Proposals to accommodate wavelength channels with different transmission directions into a single fiber similar to that of roads have been made, e.g. passive optical networks and single fiber bidirectional rings (C. H. Kim C. H. Lee, and Y. C. Chung, "Bidirectional WDM self-healing ring network based on simple bidirectional add/drop amplifier modules," *IEEE Photonics Technology Letters*, Vol. 10, No. 9, pp. 1340-1342, 1998; S. B. Park, C. H. Lee, S. G. Kang and S. B. Lee, "Bidirectional WDM self-healing ring network for hub/remote nodes," *IEEE Photonics Technology Letters*, Vol. 15, No. 11, pp. 1657-1659, 2003; X. Sun, et al "A single-fiber bi-directional WDM self-healing ring network with bi-directional OADM for metro-access applications" *Journal on Selected Area in Communications*, Vol. 25, No. 4, pp. 18-24, 2007). However, these proposals are mainly for reducing the deployment and operation costs of optical fiber networks.

The inventors have surprisingly discovered that the performance benefits and efficiency increase enabled by employing reversible wavelength channels have been neglected, even though most of the required technologies such as bidirectional couplers (M. S. Lee, I. K. Hwang, and B. Y. Kim, "Bidirectional wavelength-selective optical isolator," *Electronics Letters*, Vol. 37, No. 14, pp. 910-912. 2001; X. K. Hu, et al, "A wavelength selective bidirectional isolator for access optical networks," *Optical Fiber Technology*, Vol. 17, pp. 191-195, 2011), bidirectional add-drop multiplexers (K. P. Ho, S. K. Liaw, and Chinlon Lin, "Performance of an eight-wavelength bidirectional WDM add/drop multiplexer with 80-Gbit/s capacity," *Proceedings of OFC* 1997, pp. 90-91, 1997; Y. Shen, X. Wu, C. Lu, T. H. Cheng, and M. K. Rao, "A Novel Single-Fiber Bidirectional Optical Add/Drop Multiplexer for Distribution Networks," *Proceedings of OFC* 2001, paper WY5, 2001; A. V. Tran, C. J. Chae, and R. S. Tucker, "A bidirectional optical add-drop multiplexer with gain using multiport circulators, fiber Bragg gratings, and a single unidirectional optical amplifier," *IEEE Photonics Technology Letters*, Vol. 17, No. 7, pp. 975-977, 2003; S. K. Liaw, et al, "Bidirectional reconfigurable optical add-drop multiplexer with power compensation built-in optical amplifiers," *Journal of Optical Networking*, Vol. 7, No. 7, pp. 662-672, 2008), bidirectional optical amplification (J. M. P. Delavaux, et al, "WDM repeaterless bi-directional transmission of 73 channels at 10 Gbit/s over 126 km of True Wave fiber," *Proceedings of ECOC* 1997, pp. 21-23, 1997; C. H. Chang and Y. K. Chen, "Demonstration of repeaterless bidirectional transmission of multiple AM-VSB CATV signals over conventional single-mode fiber," *IEEE Photonics Technology Letters*, Vol. 12, No. 6, pp. 734-736, 2000; H. H. Lu, H. L. Ma, and C. T. Lee, "A Bidirectional hybrid DWDM system for CATV and OC-48 trunking," *IEEE Photonics Technology Letters*, Vol. 13, No. 8, pp. 902-904, 2001; M. Karasek, J. Vojtech, and J. Radil, "Bidirectional repeaterless transmission of 8×10 GE over 210 km of standard single mode fibre," *IET Optoelectron.*, Vol 1, No. 2, pp. 96-100, 2007; M. Oskar van Deventer and O. J. Koning "Bidirectional transmission using an erbium-doped fiber amplifier without optical isolators," *IEEE Photonics Technology Letters*, Vol. 7, No. 11, pp. 1372-1274, 1995; S. K. Liaw, K. P. Ho, Chinlon Lin, and S. Chi, "Multichannel bidirectional transmission using a WDM MUX/DMUX pair and unidirectional in-line amplifiers," *IEEE Photonics Technology Letters*, Vol. 9, No. 12, pp. 1664-1666, 1997; C. H. Kim, C. H. Lee and Y. C. Chung, "A novel bidirectional add/drop amplifier (BADA)" *IEEE Photonics Technology Letters*, Vol. 10, No. 8, pp. 1118-1120, 1998; L. D. Garrett, et al, "Bidirectional ULH transmission of 160-Gb/s full-duplex capacity over 5000 km in a fully bidirectional recirculating loop," *IEEE Photonics Technology Letters*, Vol. 16, No. 7, pp. 1757-1759, 2004; M. H. Eiselt, et al., "Field trial of a 1250-km private optical network based on a single-fiber, shared-amplifier WDM system," *Proceedings of NFOEC* 2006, paper NThF3, 2006), and bidirectional optical switches (J. Kim and B. Lee, "Independently switchable bidirectional optical cross connects," *IEEE Photonics Technology Letters*, Vol. 12, No. 6, pp. 693-695, 2000; S. Kim "Bidirectional optical cross connects for multiwavelength ring networks using single arrayed waveguide grating router," *Journal of Lightwave Technology*, Vol. 20, No. 2, pp. 188-194, 2002; H. Yuan, W. D. Zhong, and W. Hu, "FBG-based bidirectional optical cross connects for bidirectional WDM ring networks," *Journal of Lightwave Technology*, Vol. 22, No. 12, pp. 2710-2721, 2004; S. K. Liaw, P. S. Tsai, K. Y. Hsu, and A. Tverjanovich, "Power-compensated 3×3 reconfigurable bidirectional multiwavelength cross-connect device based on strain tunable fiber Bragg gratings," *Proceedings of NoC* 2011, paper CPI-6. 2011; P. Ghelfi, et al, "Optical cross connects architecture with per-node add & drop functionality," *Proceedings of NFOEC* 2007, paper NTuC3, 2007) are already available. However, to our knowledge no study on a reversible wavelength channel for optical communication networks has been reported. Thus, this appears to be a technological blind-spot which the inventors have now peered more deeply into. By conducting significant research and effort into this hidden application, the inventors have recognized the potential efficiency increase and dynamic flexibility increase enabled by these existing technologies.

The usage of reversible wavelength channels for use in wavelength-routed (WR) networks and specifically, wavelength division multiplexing (WDM) utilizes components in existing infrastructure more efficiently, thereby allowing networks a previously-impossible flexibility to fully utilize the deployed optical fiber network infrastructure. This may reduce the need for new fiber infrastructure deployments, installations, and extensions even if the traffic becomes more dynamic, or if the traffic patterns deviate greatly from the original design plans. The reversible wavelength channels also allow easier upgrading of the WDM network by adding additional devices to existing networks, rather than by installing completely new fiber infrastructures. Also, as the required technology for reversible wavelength channels is already available, there is no foreseeable technology bottleneck for implementation.

TABLE 1

Required transmission bandwidth between nodes in wavelength channels

| destination source | Node 1 | Node 2 | Node 3 |
|---|---|---|---|
| Node 1 | 0 | 1 | 0 |
| Node 2 | 2 | 0 | 1 |
| Node 3 | 1 | 2 | 0 |

A. Principle and System Requirements

FIG. 1 shows three nodes (labeled with Node 1, Node 2 and Node 3) of a WR network with reversible wavelength channels. A node is simply represented by a combination of wavelength multiplexers (MUX 11), demultiplexers (DEMUX 12) and optical switch (SW 13). Specifically, these wavelength multiplexers (MUX 11), demultiplexers (DEMUX 12) and optical switch (SW 13) are bidirectional. More specifically, the multiplexers (MUX 11) is for multiplexing a plurality of input signals into the one channel signal; the demultiplexers (DEMUX 12) is for demultiplexing the at least one channel signal into a plurality of output signals, and the optical switch (SW 13) is for switching transmission of the at least one channel signal between two optical fibers. At least one of the nodes may include an electronic device.

In FIG. 1, each node has four fibers connected to its adjacent nodes and there are two wavelength channels ($\lambda_1$ and $\lambda_2$) per fiber, i.e., Ports 1 and 2 of a node are connected to Ports 3 and 4 of its adjacent node in the figure. Assuming that the required data transmission bandwidth between nodes in units of wavelength channels (also shown in Table I) are (1) Node 1 receives two units from Node 2 and one unit from Node 3, (2) Node 2 receives one unit from Node 1 and two unit from Node 3, and (3) Node 3 receives one unit from Node 2. This requires us to allocate three wavelength channels connecting from Node 3 to Node 2 and another three from Node 2 to Node 1. Also, we need one wavelength channel connecting from Node 1 to Node 2 and another one from Node 2 to Node 3. If this is a traditional WR network, there will be a problem to set up lightpaths to meet such bandwidth requirement, since traditional WR networks only have non-reversible wavelength channels, each with a fixed transmission direction. Most likely, the two fibers connecting two nodes are in opposite transmission directions. It would thus be impossible to set up the required efficient lightpaths within these three nodes in a traditional WR network. Therefore the system would need to block some of the transmission requests.

On the other hand, according to the present invention, we may set up lightpaths (a) to (g) as shown in FIG. 1 if the wavelength channel directions are reversible. The wavelength channels in the upper two fibers of FIG. 1 are configured with a transmission direction from right to left. Those in the lower two fibers are configured with Channel $\lambda_1$ to left and Channel $\lambda_2$ to right, i.e., the lower two fibers in FIG. 1 are bidirectional transmission fibers.

Reversible wavelength channels allow the flexibility to fully utilize the deployed optical fiber network infrastructures to lessen the need for new fiber infrastructure deployments even if the traffic becomes dynamic, or if the traffic patterns have deviated greatly from the original design plans. Note that fiber infrastructures are one of the major investments in optical fiber communication networks. As shown in FIG. 1, however, reversible wavelength channels will require WR network devices to be bidirectional and reconfigurable.

First of all, to maximize flexibility, in an embodiment herein each wavelength channel on a fiber is reconfigurable to support data transmission in either direction. Note that a reversible wavelength channel, like a reversible lane in a highway system, can have transmission in only one direction at any moment but with flexibility of the direction being configurable at the setup of a lightpath. We do not consider the case of transmissions in two channels with the same wavelength but different directions because one skilled in the art understands that it is possible with short distance fiber links only (M. Oskar van Deventer, *Fundamentals of bidirectional transmission over a single optical fibre*, Boston: Kluwer Academic, 1996). As wavelength multiplexers and demultiplexers are in general passive devices and bidirectional, a fiber without an isolator to limit the optical signal reflection can be considered as a bidirectional link. Recently, bidirectional isolators have also been proposed to improve the transmission performance of bidirectional fiber links (M. S. Lee, I. K. Hwang, and B. Y. Kim, "Bidirectional wavelength-selective optical isolator," *Electronics Letters*, Vol. 37, No. 14, pp. 910-912. 2001; X. K. Hu, et al, "A wavelength selective bidirectional isolator for access optical networks," *Optical Fiber Technology*, Vol. 17, pp. 191-195, 2011), i.e., a single fiber with channels in different directions. In an embodiment herein, reversible wavelength channels may contain bidirectional isolators to be reconfigurable and the required technologies have already been demonstrated in other devices such as bidirectional add-drop multiplexers (K. P. Ho, S. K. Liaw, and Chinlon Lin, "Performance of an eight-wavelength bidirectional WDM add/drop multiplexer with 80-Gbit/s capacity," *Proceedings of OFC* 1997, pp. 90-91, 1997; Y. Shen, X. Wu, C. Lu, T. H. Cheng, and M. K. Rao, "A Novel Single-Fiber Bidirectional Optical Add/Drop Multiplexer for Distribution Networks," *Proceedings of OFC* 2001, paper WY5, 2001; A. V. Tran, C. J. Chae, and R. S. Tucker, "A bidirectional optical add-drop multiplexer with gain using multiport circulators, fiber Bragg gratings, and a single unidirectional optical amplifier," *IEEE Photonics Technology Letters*, Vol. 17, No. 7, pp. 975-977, 2003; S. K. Liaw, et al, "Bidirectional reconfigurable optical add-drop multiplexer with power compensation built-in optical amplifiers," *Journal of Optical Networking*, Vol. 7, No. 7, pp. 662-672, 2008). The bidirectional isolators is for limiting reflection of the at least one channel signal.

Figure 2:
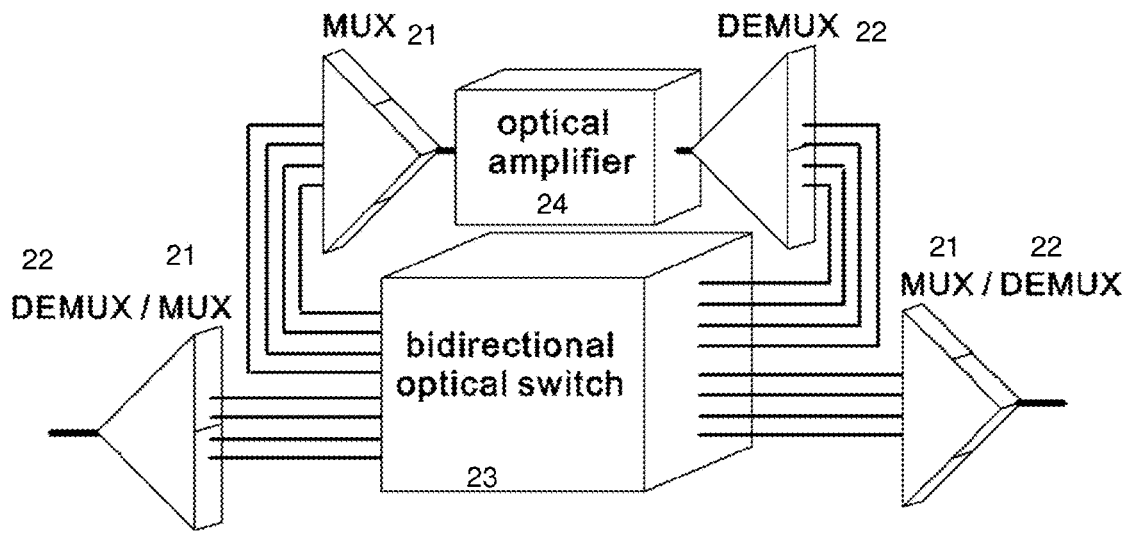
FIG. 2 shows a reconfigurable bidirectional optical amplifier for use in the WR network of FIG. 1.

In an embodiment herein, the reversible wavelength channels may be optically amplified by a bidirectional amplifier if the distance between nodes is long. Commercially available optical amplifiers for long distance transmissions are not bidirectional. There have been many proposals for optical amplification of bidirectional fiber links including repeaterless approaches—pre and post amplifying the optical signals at transmitters and receivers, respectively, instead of adding a bidirectional optical amplifier at the middle of the transmission path (J. M. P. Delavaux, et al, "WDM repeaterless bi-directional transmission of 73 channels at 10 Gbit/s over 126 km of True Wave fiber," *Proceedings of ECOC* 1997, pp. 21-23, 1997; C. H. Chang and Y. K. Chen, "Demonstration of repeaterless bidirectional transmission of multiple AM-VSB CATV signals over conventional single-mode fiber," *IEEE Photonics Technology Letters*, Vol. 12, No. 6, pp. 734-736, 2000; H. H. Lu, H. L. Ma, and C. T. Lee, "A Bidirectional hybrid DWDM system for CATV and OC-48 trunking," *IEEE Photonics Technology Letters*, Vol. 13, No. 8, pp. 902-904, 2001; M. Karasek, J. Vojtech, and J. Radil, "Bidirectional repeaterless trans-mission of 8×10 GE over 210 km of standard single mode fibre," *IET Optoelectron.*, Vol. 1, No. 2, pp. 96-100, 2007), and repeated approaches—adding bidirectional optical amplifiers in the path (M. Oskar van Deventer and O. J. Koning "Bidirectional transmission using an erbium-doped fiber amplifier without optical isolators," *IEEE Photonics Technology Letters*, Vol. 7, No. 11, pp. 1372-1274, 1995; S. K. Liaw, K. P. Ho, Chinlon Lin, and S. Chi, "Multichannel bidirectional transmission using a WDM MUX/DMUX pair and unidirectional in-line amplifiers," *IEEE Photonics Technology Letters*, Vol. 9, No. 12, pp. 1664-1666, 1997; C. H. Kim, C. H. Lee and Y. C. Chung, "A novel bidirectional add/drop amplifier (BADA)" *IEEE Photonics Technology Letters*, Vol. 10, No. 8, pp. 1118-1120, 1998; L. D. Garrett, et al, "Bidirectional ULH transmission of 160-Gb/s full-duplex capacity over 5000 km in a fully bidirectional recirculating loop," *IEEE Photonics Technology Letters*, Vol. 16, No. 7, pp. 1757-1759, 2004; M. H. Eiselt, et al., "Field trial of a 1250-km private optical network based on a single-fiber, shared-amplifier WDM system," *Proceedings of NFOEC* 2006, paper NThF3, 2006). The inventors believe that using bidirectional optical amplifiers will allow the networks to have a larger coverage. Among the proposed bidirectional optical amplifiers, the co-propagating amplifier architecture (L. D. Garrett, et al. and M. H. Eiselt, et al.) is suggested as the building block for the required reconfigurable bidirectional optical amplifiers as shown in FIG. 2. This is because commercially available high performance erbium doped fiber amplifiers (EDFAs) optimized for low noise figure and high output power are fundamentally unidirectional devices. Also, the good performance of co-propagating architecture bidirectional amplifiers has been demonstrated in both laboratory and field trials. By adding the bidirectional optical switch 23, the optical signals from left and right fibers in FIG. 2 can pass through the optical amplifier 24 and be routed to the proper channels of fibers at the opposite sides.

A lightpath can span two or more fiber links, e.g., lightpath (g) in FIG. 1. Hence, the optical switches in the intermediate nodes should also support bidirectional transmissions between the two or more fiber links. In principle, the optical switches built with micro-mirrors using micro electro mechanical systems (MEMS) technology are in nature bidirectional (J. Kim, et at., "1100×1100 port MEMS-based optical crossconnect with 4-dB maximum loss" *IEEE Photonics Technology Letters*, Vol. 5, No. 11, pp. 537-1539, 2003; S. J. B. Yoo, "Optical packet and burst switching technologies for the future photonic Internet," *Journal of Lightwave Technology*, Vol. 24, No. 12, pp. 4468-4492, 2006; S. Sygletos, I. Tomkos, and J. Leuthold, "Technological challenges on the road toward transparent networking," *Journal of Optical Networking*, Vol. 7, No. 4, pp. 321-350, 2008). Although MEMS optical switches have the advantage of low crosstalk, low insertion loss, and up to a thousand input/output ports, their cost and reliability issues have encouraged other kinds of bidirectional optical switches to be proposed with technologies such as tunable fiber grating and/or arrayed waveguide grating (AWG) (J. Kim and B. Lee, "Independently switchable bidirectional optical cross connects," *IEEE Photonics Technology Letters*, Vol. 12, No. 6, pp. 693-695, 2000; S. Kim "Bidirectional optical cross connects for multiwavelength ring networks using single arrayed waveguide grating router," *Journal of Lightwave Technology*, Vol. 20, No. 2, pp. 188-194, 2002; H. Yuan, W. D. Zhong, and W. Hu, "FBG-based bidirectional optical cross connects for bidirectional WDM ring networks," *Journal of Lightwave Technology*, Vol. 22, No. 12, pp. 2710-2721, 2004; S. K. Liaw, P. S. Tsai, K. Y. Hsu, and A. Tverjanovich, "Power-compensated 3×3 reconfigurable bidirectional multiwavelength cross-connect device based on strain tunable fiber Bragg gratings," *Proceedings of NoC* 2011, paper CPI-6. 2011; P. Ghelfi, et al, "Optical cross connects architecture with per-node add & drop functionality," *Proceedings of NFOEC* 2007, paper NTuC3, 2007). However, the scalability of such bidirectional optical switches at the moment is not as good as that of MEMS optical switches.

Figure 3:
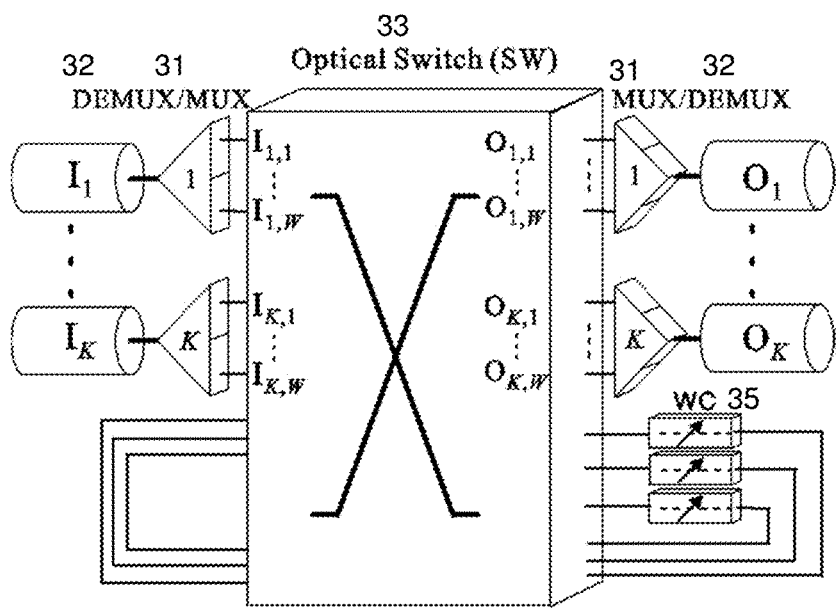
FIG. 3 shows a WR node with reversible wavelength channels and wavelength conversion capability.

Lightpaths passing through the same fiber link must be assigned channels of different wavelengths regardless of the lightpath direction. Wavelength contention may therefore also occur when we set up new lightpaths in networks with reversible wavelength channels. Actually, it is as necessary to solve the routing and wavelength assignment (RWA) problem as in normal WR networks except that lightpaths having opposite directions can pass through the same fiber link, e.g., lightpaths (a) and (b) in FIG. 1. Wavelength converters (WCs) for converting the wavelength channels so that the channels are adapted to be transmitted by the same optical fiber link, can be used to reduce the lightpath setup blocking probability caused by wavelength contentions. In normal WR networks, WCs can be added at either the inputs or outputs of the optical switch in a WR node. However, such approaches may not be applicable in this case because the WC must be transmission direction reconfigurable. A more feasible approach is as shown in FIG. 3, i.e., optical signals from both sides of the RW node can be wavelength converted by the shared-by-node WCs 35 (K. C. Lee, and V. O. K. Li, "A wavelength-convertible optical network," *Journal of Lightwave Technology*, Vol. 11, No. 5, pp. 962-970, 1993) before being switched to their preferred fiber links.

A WR node should be able to transmit/receive the local user data to/from the proper wavelength channels of the proper fibers. In FIG. 1, Node 3 can send local user data to channels ($\lambda_1$ and $\lambda_2$) on fiber connected to Port 1 and Channel $\lambda_1$ on fiber connected to port 2 so that Node 1 can receive the data from those channels, i.e., the lightpaths (e), (f) and (g). As each wavelength channel can serve as input and output, the bidirectional optical switches inside the nodes should be able to connect a user transmitter/receiver to any channel of any fiber connected to the node. In an embodiment herein the optical switches can provide per-node add-drop functionality (P. Ghelfi, et al, "Optical cross connects architecture with per-node add & drop functionality," *Proceedings of NFOEC* 2007, paper NTuC3, 2007). Depending on implementation considerations, bidirectional add-drop multiplexers may also be first used on each port (K. P. Ho, S. K. Liaw, and Chinlon Lin, "Performance of an eight-wavelength bidirectional WDM add/drop multiplexer with 80-Gbit/s capacity," *Proceedings of OFC* 1997, pp. 90-91, 1997; Y. Shen, X. Wu, C. Lu, T. H. Cheng, and M. K. Rao, "A Novel Single-Fiber Bidirectional Optical Add/Drop Multiplexer for Distribution Networks," *Proceedings of OFC* 2001, paper WY5, 2001; A. V. Tran, C. J. Chae, and R. S. Tucker, "A bidirectional optical add-drop multiplexer with gain using multiport circulators, fiber Bragg gratings, and a single unidirectional optical amplifier," *IEEE Photonics Technology Letters*, Vol. 17, No. 7, pp. 975-977, 2003; S. K. Liaw, et al, "Bidirectional reconfigurable optical add-drop multiplexer with power compensation built-in optical amplifiers," *Journal of Optical Networking*, Vol. 7, No. 7, pp. 662-672, 2008), e.g., Ports 1, 2, 3 and 4 in FIG. 1. Nevertheless, extra hardware is then needed to provide the per-node add-drop functionality.

The numbers of transmitters and receivers of a k-degree normal WR node with f fibers per link and w channels per fiber are kfw because they should be equal to the numbers of available output and input wavelength channels, e.g., there will be four transmitters and four receivers in each node of FIG. 1 for a normal WR network. As in the proposed system a node can configure all its available wavelength channels as either inputs or outputs, we can in principle install up to 2 kfw transmitters and receivers at a node to have the best system performance. However, the maximum utilization of transmitters and receivers will only be 50% in this case. In general, the numbers of transmitters and receivers of reversible wavelength channels can be equal to that of normal WR networks if the fluctuation of traffic distribution is not drastic. In the following sections, we will discuss the demonstrated significant performance improvement that can be obtained with reversible wavelength channels even if only kfw transmitters and receivers per node are used.

The above discussions show that most of the required technologies for reversible wavelength channels are already available, and there is no foreseeable technology bottleneck. Reversible wavelength channels allow us to upgrade WR network by using additional devices rather than by installing new fiber infrastructures.

B. Application Scenarios

At the moment, reversible wavelength channels are likely to be more suitable for access/metro networks because of the dynamic traffic characteristic and the less stringent optical signal power tolerance. Reversible wavelength channels could provide significant improvement to the blocking performance even if the network traffic is statistically symmetric, i.e., on average the intensity of traffic from Node A to Node B equals that from Node B to Node A. Obviously, reversible wavelength channels will add little gain if the traffic symmetry is deterministic, e.g., another connection must be set up from Node B to Node A simultaneously when a connection is set up from Node A to Node B. Also, networks with highly static traffic will not benefit from the flexibility of reversible wavelength channels. Therefore, wavelength reversible channels may not be attractive to current optical backbones because their traffic is highly aggregated on high capacity trunks. In contrast, a recent study shows that the traffic characteristics of access/metro networks are rather dynamic and asymmetric (G. Maier, A. Feldmann, V. Paxson, and M. Allman "On dominant characteristics of residential broadband internet traffic," *Proceedings of the 9th ACM SIGCOMM conference on Internet measurement conference* (IMC 2009), 2009). Therefore the present invention may be useful in such networks.

Unlike systems with a fixed channel direction, the optical signals in an embodiment of our proposed system possess extra demultiplexing/multiplexing and switching processes when they are re-amplified (see the optical amplifier shown in FIG. 2) because of the direction configurability of each wavelength channel. The signal power loss caused by the extra processes may be up to 5 to 10 dB depending on the implementation details. It is preferable that the signal attenuation between nodes is reduced such that the quality of the optical signals is still above the minimum requirements after the additional processing. Otherwise, optical amplifiers with larger gain and higher output power will be needed to compensate for the extra signal power loss, i.e., longer erbium doped fiber, stronger pump laser, and multistage approach will have to be used for the EDFAs (R. I. Laming and D. N. Payne, "Noise characteristic of Erbium-doped fiber amplifier pumped at 980 nm," *IEEE Photonics Technology Letters*, Vol. 2, No. 6, pp. 418-421, 1990; R. G. Smart, J. L. Zyskind, J. W. Sulhoff, and D. J. DiGiovanni, "An investigation of the noise figure and conversion efficiency of 0.98 μm pumped Erbium-doped fiber amplifiers under saturated conditions," *IEEE Photonics Technology Letters*, Vol. 4, No. 11, pp. 1261-1264, 1992; H. Bulow and Th. Pfeiffer, "Calculation of the noise figure of Erbium-doped fiber amplifiers using small signal attenuations and saturation powers," *IEEE Photonics Technology Letters*, Vol. 4, No. 12, pp. 1351-1354, 1992). Apart from the extra cost incurred, physical layer issues such as optical signal to noise ratio (OSNR) will be a concern when using higher power optical amplifiers. Hence, networks with tight link budget and stringent OSNR requirement such as the optical backbones may require significant effort to integrate the reversible wavelength channels into the system. On the other hand, all these issues are easier to handle in the access/metro networks.

The inventors herein recognize that further complications will arise if Raman amplifiers (M. N. Islam, "Raman amplifiers for telecommunications," *IEEE Journal of Selected Topics in Quantum Electronics*, Vol. 8, No. 3, pp. 548-559, 2002), instead of EDFAs, are used to amplify the signals. Despite its many advantages, Raman amplification is polarization-dependent, i.e. Raman gain depends on the mutual orientation of the states of polarization of the pump and signal waves. As most optical fibers are slightly birefringent, typical Raman amplifiers will use the backward pumping scheme such that the polarizations of the Raman pump and the signal will be rapidly varying relative to each other. The Raman gain will then be effectively averaged. Thus the inventors herein recognize that polarization-dependent gain such as that obtained with Raman amplifiers or optical parametric amplifiers poses a significant challenge to reversible wavelength channels. Bi-directional pumping, polarization scrambling, and polarization diversity can be used to alleviate the polarization dependence of the Raman gain at the expense of increasing hardware cost and system complexity. Therefore, in an embodiment herein, the optical transmission system herein is substantially free of Raman amplification and/or Raman amplifiers.

C. Performance Evaluation

Figure 4:
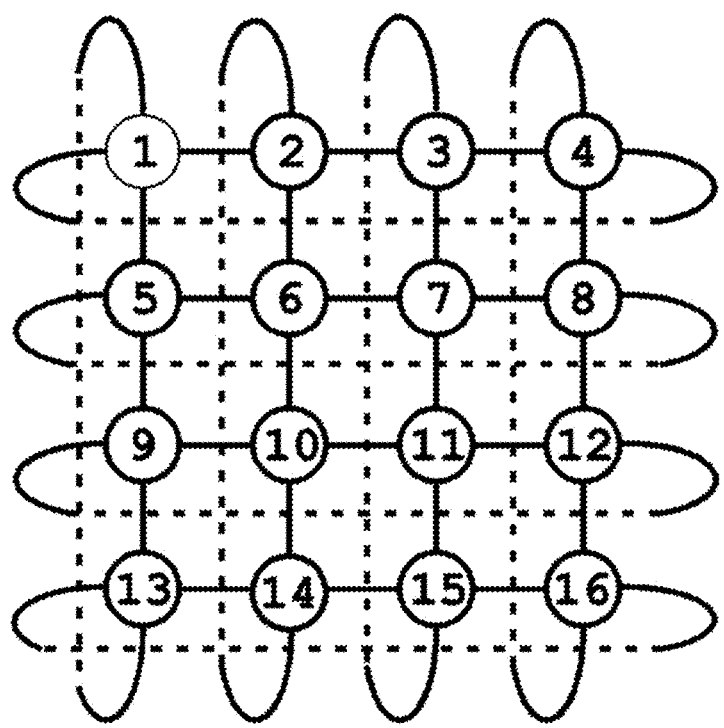
FIG. 4 shows a 4×4 mesh network as embodied in the present invention.
Figure 5:
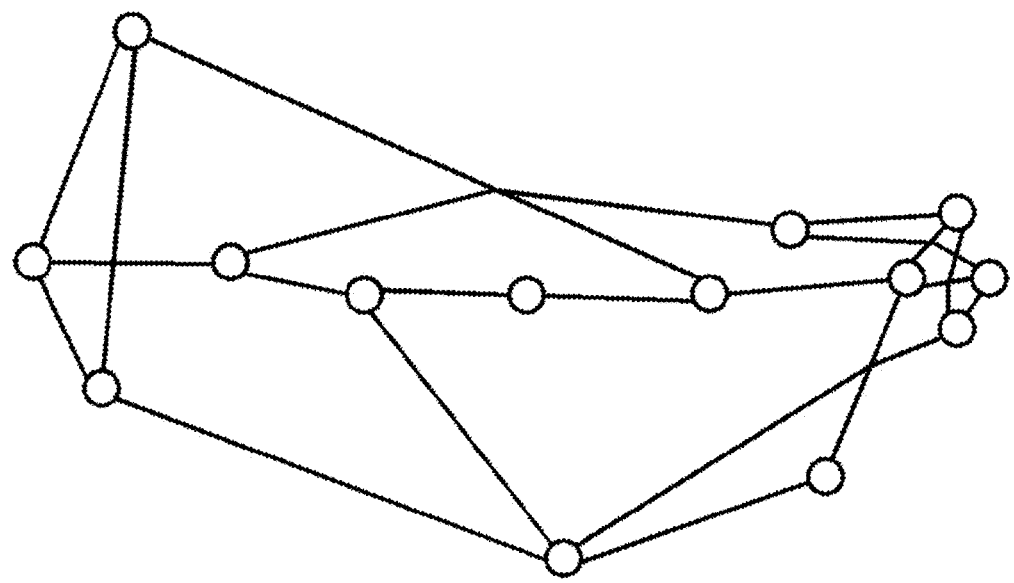
FIG. 5 shows the NSFNet (1991) network topology as embodied in the present invention.

We first demonstrate the blocking performance of the proposed reversible wavelength channel approach on the 16-node ring network, the 4×4 mesh network (FIG. 4), and the NSFNet topology network (FIG. 5) with the assumption that the total traffic in each direction of a pair of nodes are statistically symmetric, i.e., the traffic from Node A to Node B will be on the average equal to that of Node B to Node A. We therefore will have a general concept of the performance of the reversible wavelength channel approach on regular topology (ring and mesh) and irregular topology (NSFNET) networks. In the simulations, two adjacent nodes of a network are connected by two links which have opposite transmission directions if the normal WR network approach is used. For the reversible wavelength channel approach being used, however, the transmission directions of all wavelength channels in the two links are reversible. There may be one, two, four, and eight fibers per link, depending on the simulation requirement. We assume that there are 32 wavelength channels per fiber. A user data transmission request arrives at the system as a Poisson process and chooses a random pair of source and destination nodes. Shortest path routing is used to set up the required lightpath. After a lightpath has been set up between the source and destination, the holding time of the lightpath will be an exponential random number with a mean of one time unit. If there is no wavelength channel available on any link of the path, the data transmission request will be blocked. The numbers of transmitters and receivers in a k-degree normal WR node is kfw where f is number of fibers per link and w is the number of channels per fiber. We assume that there are also kfw transmitters and receivers in the k-degree node of the networks with reversible wavelength channels. We use the batched mean method (batch size of $10^4$ time units) with discarding the first batch to compute the results. All simulations are run sufficiently long such that 95% confidence intervals are less than 1% of the results.

In normal WR networks, two lightpaths with the same end nodes but opposite directions will never have bandwidth and wavelength contentions with each other. It is because path $(n_1, n_k) = \{n_1, n_2, \ldots n_k\}$ implies path $(n_k, n_1) = \{n_k, n_{k-1}, \ldots n_1\}$ from shortest routing and fiber links with opposite directions are used to connect node pairs $(n_x, n_y)$ and $(n_y, n_x)$. Hence, a normal WR network can be considered as two independent networks each of which has its own sets of lightpaths and fiber links if we partition the lightpaths and fiber links according to their transmission directions. Note that this observation may not be valid if the lightpath routing is not shortest path routing. With reversible wavelength channels, it is conceptually equal to combining the link capacities and traffic loadings of the two independent networks. Evidently, the lightpath setup blocking probability will be much smaller regardless of the traffic distributions since it is well-known that doubling a link capacity will improve the blocking performance even if the loading is also doubled (F. P. Kelly, "Block probabilities in large circuit-switched networks," *Advances in Applied Probability*, Vol. 18, pp. 473-

505, 1986). Hence, the proposed reversible wavelength channel approach should also provide performance improvement in the symmetric traffic situations. To demonstrate the validity of the concept, we also plot the results of WR networks with double the link capacity and traffic loading in symmetric traffic situations. Their blocking probabilities should be very close to that of reversible wavelength channels.

Figure 6:
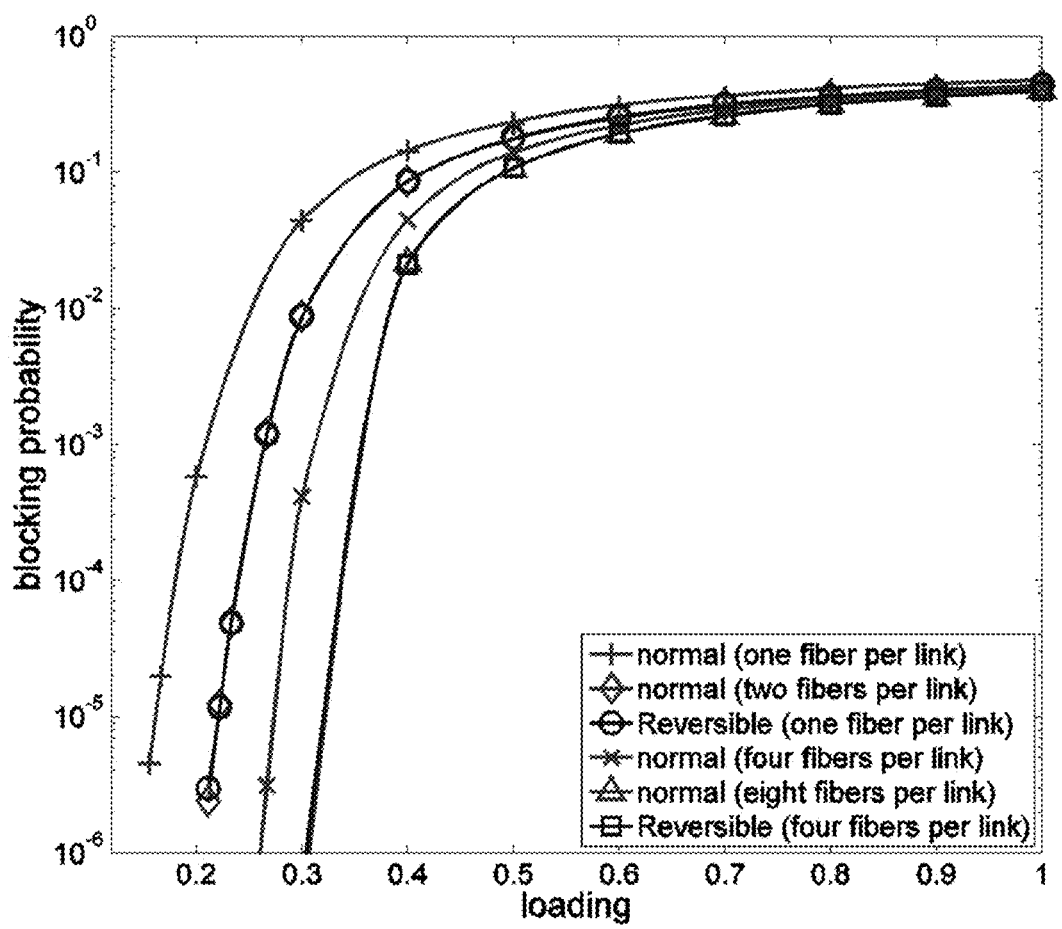
FIG. 6 shows blocking performance of the embodied reversible wavelength channel approach on the 16-node ring network with symmetric total traffic. There are 32 wavelength channels per fiber. Maximum absolute per node loadings of the curves with pluses and circles: 32 erlangs, curves with diamonds: 64 erlangs, curves with crosses and squares: 128 erlangs, and curves with triangles: 256 erlangs.
Figure 7:
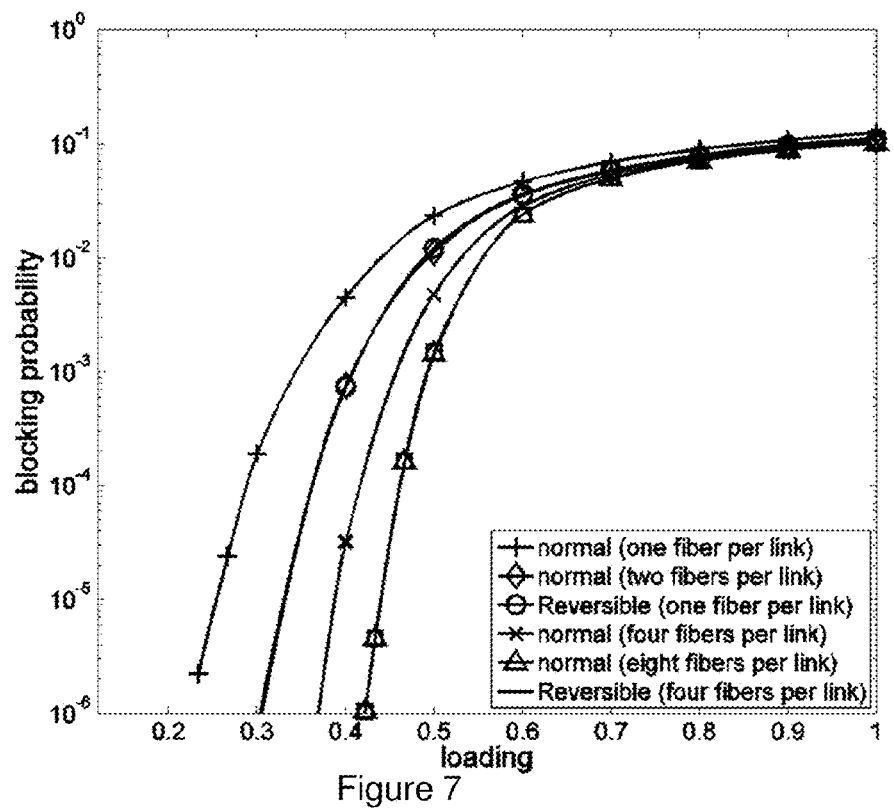
FIG. 7 shows blocking performance of the embodied reversible wavelength channel approach on the 4×4 mesh network with symmetric total traffic, with the same traffic parameters as those of FIG. 6.
Figure 8:
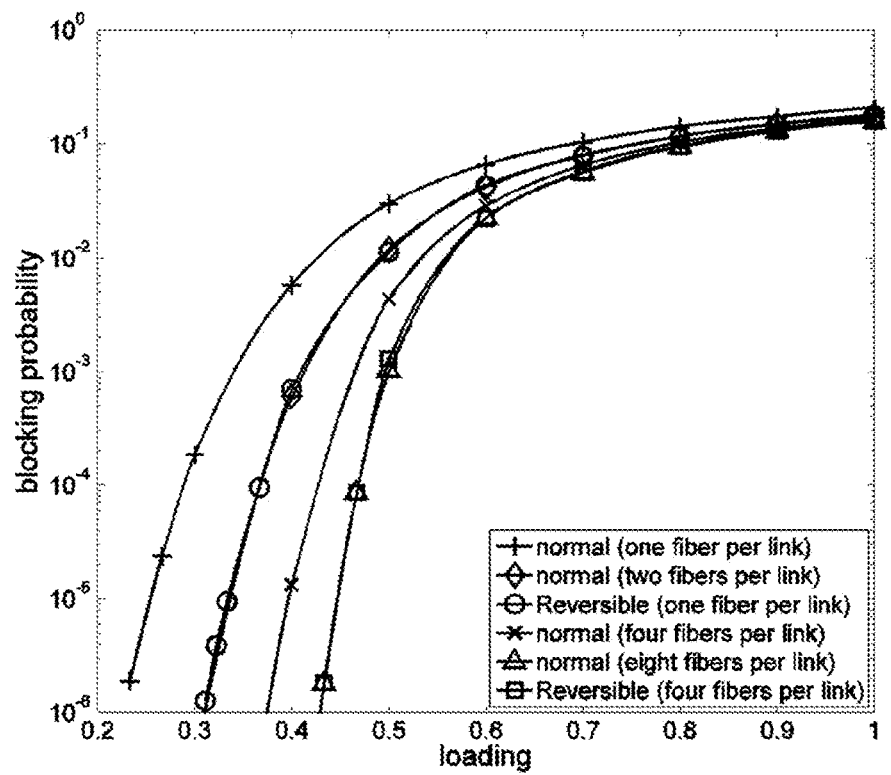
FIG. 8 shows blocking performance of the proposed reversible wavelength channel approach on the NSFNet topology network with symmetric total traffic, with the same traffic parameters as those of FIG. 6.

FIGS. 6 to 8 show the simulation results. The loading in the horizontal axis of the figures is a normalized value of (number of transmission data requests in a time unit)/ (number of nodes×number of channels per fiber×number of fibers per link×minimum number of node degree in the network). From this arrangement, we can directly compare the blocking performance of systems with different numbers of fibers per link in the same figure. To allow one to have a rough idea when comparing capacity against loadings, the maximum absolute per node loadings of all curves are also marked in the figures. In the figures, the curves with pluses, diamonds, crosses, and triangles are the blocking probabilities for normal WR networks with one, two, four and eight fibers per link, respectively, while the curves with circles and squares are for those using reversible wavelength channels on networks with one and four fiber per link. From the figures, we observe that significant blocking performance improvement has been obtained no matter of the network topology being ring, mesh and NSFNet. From FIG. 6 to FIG. 8, we observe that the blocking performance of WR networks with reversible wavelength channel is close to that of WR networks with double the link capacity and traffic loading, i.e., the curves with circles and squares are nearly overlapping the curves with diamonds and triangles. Hence, one can confirm that the reversible wavelength channel approach can provide a significant, unexpected performance improvement for different network topologies and different number of fibers per link even if the traffic between any pair of nodes is symmetric.

Figure 9:
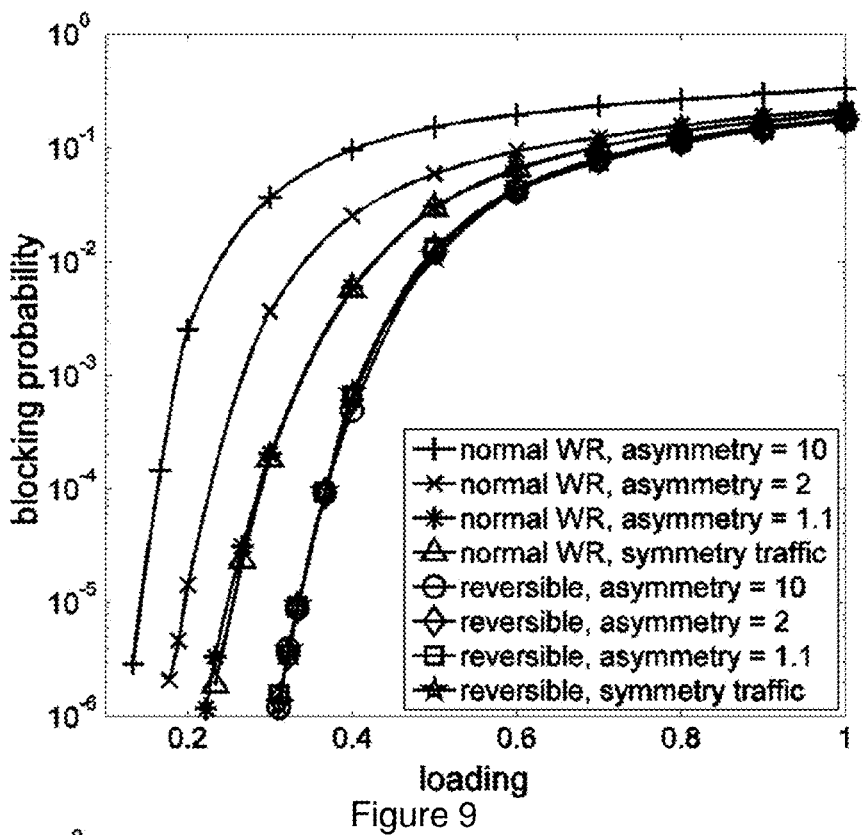
FIG. 9 shows blocking performance of the proposed reversible wavelength channel approach on the NSFNet topology network with different asymmetry factors. There are 32 wavelength channels per fiber but only one fiber per link. The maximum absolute per node loadings of all curves are 32 erlangs.
Figure 10:
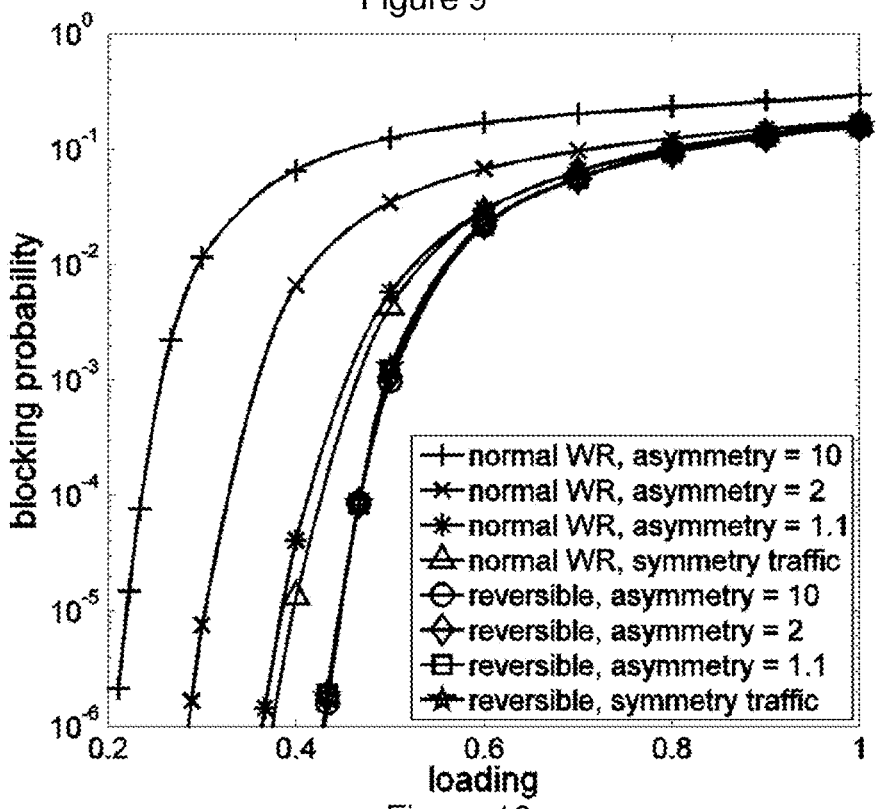
FIG. 10 shows blocking performance of the proposed reversible wavelength channel approach on the NSFNet topology network with different asymmetry factors. There are 32 wavelength channels per fiber and four fibers per link. The maximum absolute per node loadings of all curves are 128 erlangs.

For the blocking performance of the proposed reversible wavelength channel approach in the cases of asymmetric traffic, we only show the results for the NSFNet topology network since other results are similar. FIGS. 9 and 10 show the simulation results for the cases of one and four fibers per link when the traffic between any pair of node is asymmetric. In the simulations, we flip a biased coin when two nodes are chosen for the source and destination. According to the outcome of the flip, we may swap the source and destination assignment such that the total traffic from one transmission direction over that from another direction will be on the average equal to an asymmetry factor. For convenience, asymmetry factor is equal to or large than one. Surely, a network with symmetric traffic will have an asymmetry factor of one. A network with larger asymmetry factor means that the traffic between each pair of nodes becomes more asymmetric. In FIGS. 9 and 10, the curves with triangles, asterisks, crosses, and pluses represent the results of normal WR networks with asymmetry factors of 1, 1.1, 2 and 10, respectively, while the curves with stars, squares, diamonds and circles are for those using reversible wavelength channels. From FIGS. 9 and 10, one can observe that normal WR networks will suffer greatly when the system traffic becomes asymmetric. On the other hand, it has surprisingly been found that reversible wavelength channel WR networks will have similar blocking performance even if the asymmetry factor increases from 1 to 10. As we discussed in previous paragraphs, reversible wavelength channel approach is conceptually equal to combine the capacities and traffic loadings of the two links originally having opposite transmission directions in normal WR networks. Modifying the ratio of loading traffic on the opposite direction links will not change the blocking probability if the total traffic loading remains unchanged. This demonstrates the effectiveness of the reversible wavelength channel approach in handling the frequent changes of network traffic patterns that we may not have foreseen. Though the reversible wavelength channel approach requires many WR network devices to be upgraded, the investment will provide significant advantages and flexibility.

D. Discussion of Other Implementation Approaches

So far, we have assumed that all wavelength channels of all links in a WR network are reversible. From a practical point of view, this may be costly and not necessary in many occasions. For example, one may prefer to upgrade only some links of a network to have reversible wavelength channels. Clearly, it will be an interesting and complicated optimization problem to find out the proper locations and numbers of links to maximize the system performance with minimum hardware upgrade. Another implementation alternative is to use the reversible waveband approach. From FIG. 2, one may observe that the size of the optical switch in the bidirectional optical amplifier will grow with the number of wavelength channels. If the reversibility of transmission direction is waveband-based, waveband switches can be used to reduce the cost. Note that waveband reversibility is a compromise between performance and implementation cost. In some occasions, one may encounter a substantial reduction of reversibility gain.

Figure 11:
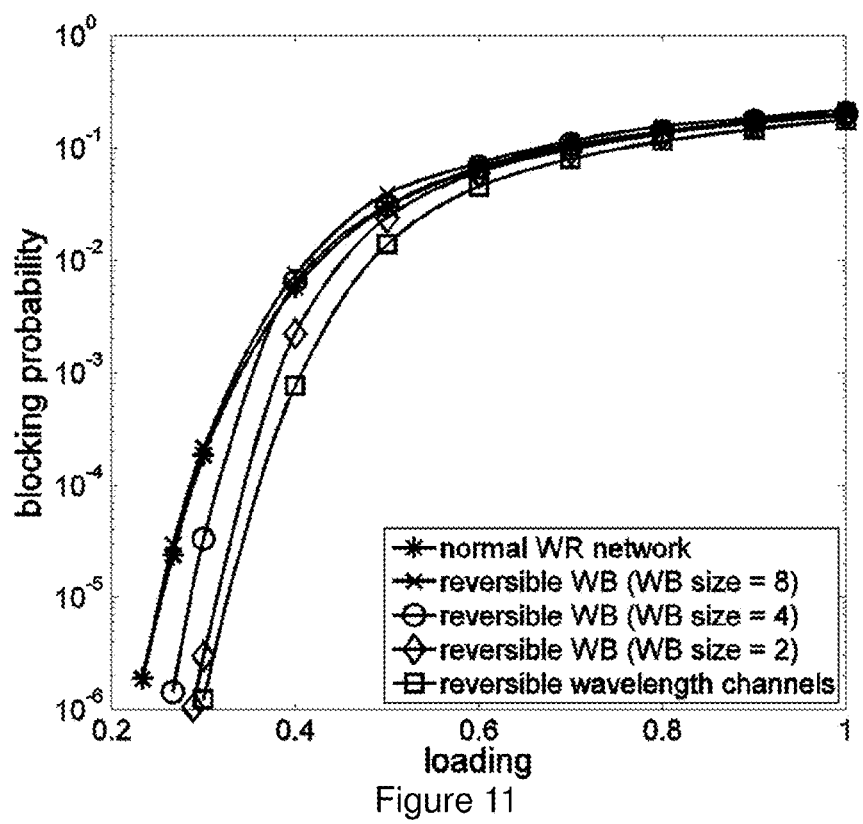
FIG. 11 shows blocking performance of the reversible waveband approach on the NSFNet topology network with symmetric total traffic. There are 32 wavelength channels per fiber but only one fiber per link. The maximum absolute per node loadings of all curves are 32 erlangs.
Figure 12:
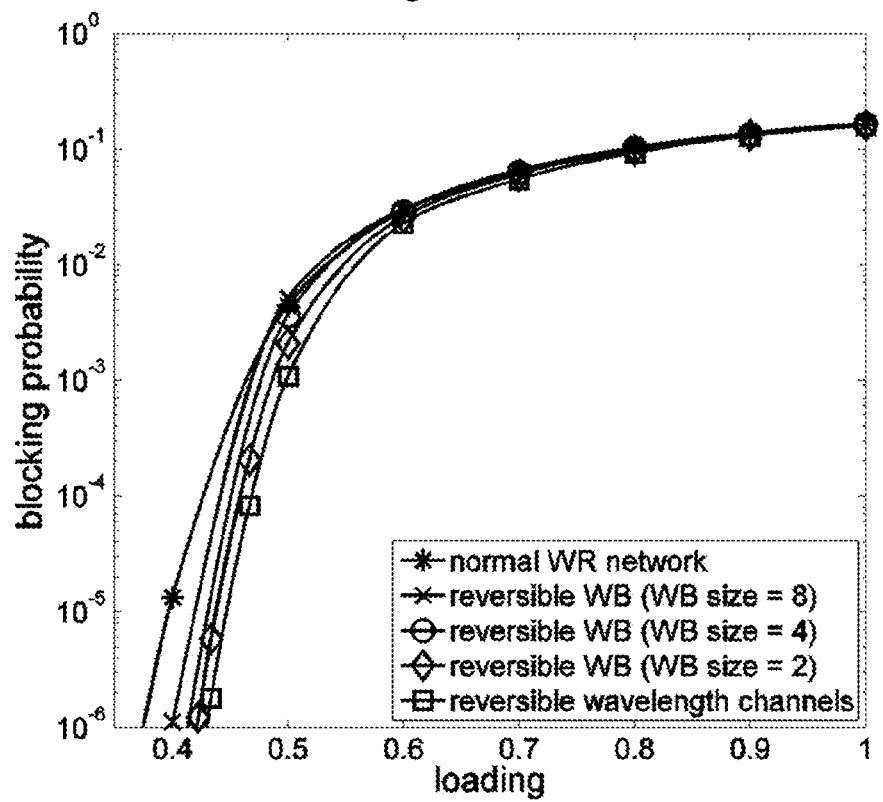
FIG. 12 shows blocking performance of the reversible waveband approach on the NSFNet topology network with symmetric total traffic. There are 32 wavelength channels per fiber and four fibers per link. The maximum absolute per node loadings of all curves are 128 erlangs.

FIGS. 11 and 12 show the blocking performance of reversible waveband approach on the NSFNet topology network with one and four fibers per link using different waveband sizes. The 32 wavelength channels in a fiber are grouped into equal size wavebands. Hence, there will be 4, 8, and 16 wavebands in a fiber if the waveband sizes are 8, 4, and 2. The transmission direction of a waveband is freely configurable if all wavelength channels in the waveband are not occupied. Since waveband switches are used in bidirectional optical amplifiers, however, the transmission direction of the waveband will be fixed once any wavelength channel in the waveband has been used for transmission. Consequently, the set up of the lightpath will become more complicated because we have to consider the transmission direction of the waveband that an idle wavelength channel belongs. Also, we should prefer to use wavebands already having channels in transmission when setting up a lightpath. This is to maximize the number of free wavebands, and to have more flexibility in setting up additional lightpaths afterward.

In FIGS. 11 and 12, the curves with diamonds, circles, and crosses are blocking probabilities of the reversible waveband approach using waveband sizes of 2, 4, and 8, respectively. For reference, blocking probabilities of normal WR network and the reversible wavelength channel approach are plotted as the curves with asterisks and squares, respectively. From FIGS. 11 and 12, we observe that the reversible waveband approach with large waveband size will not always have better blocking performance than normal WR network. For example, the curve with crosses is above the curve with asterisks in FIG. 11. The reversible waveband approach will have blocking performance close to that of the reversible wavelength channel approach only if the waveband sizes are small enough, e.g., waveband sizes≤4. Hence, one has to balance the tradeoff between performance and implementation cost if the reversible waveband approach is used.

Figure 13:
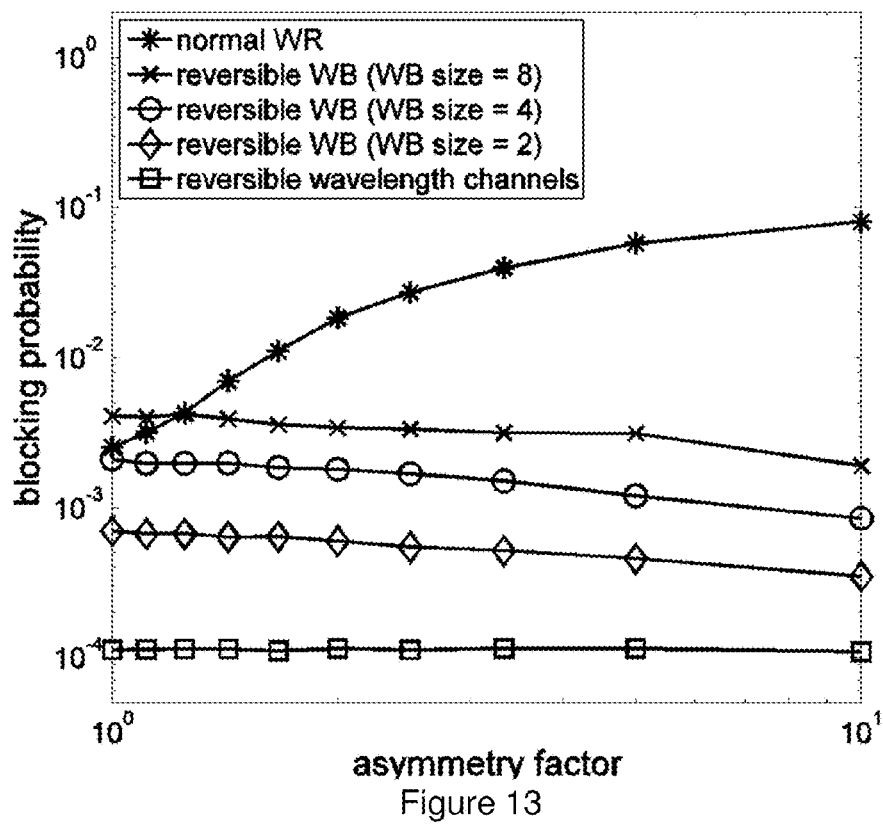
FIG. 13 shows blocking performance of reversible waveband approach on NSFNet topology network with different asymmetry factors. There are 32 wavelength channels per fiber but only one fiber per link. The maximum absolute per node loadings of all curves are 32 erlangs.
Figure 14:
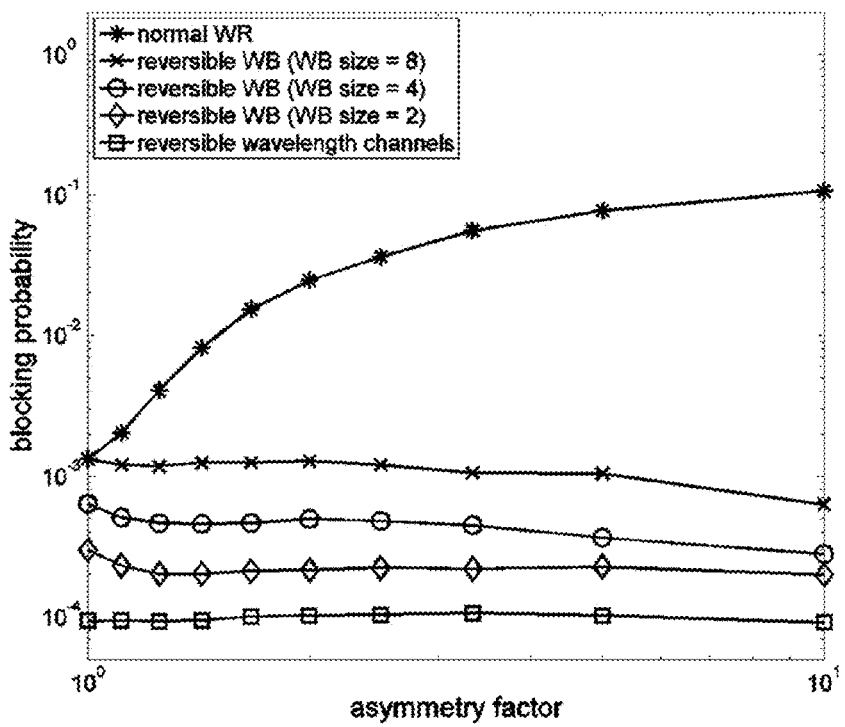
FIG. 14 shows blocking performance of reversible waveband approach on NSFNet topology network with different asymmetry factors. There are 32 wavelength channels per fiber and four fibers per link. The maximum absolute per node loadings of all curves are 128 erlangs.

A nice feature of the reversible waveband approach is that its performance is also insensitive to asymmetric traffic. FIGS. 13 and 14 are the blocking performance of the reversible waveband approach in the NSFNet topology network with one and four fibers per link. The normalized loadings are set to 0.37 and 0.43 in the two networks such that the reversible wavelength channel approach will have blocking probability about $10^{-4}$. From the figures, we observe that the blocking performance of normal WR network degrades quickly with the increase of asymmetry factor while that of the reversible wavelength channel approach basically remains unchanged in the whole range of the asymmetry factor. On the other hand, the blocking probability of the reversible waveband approach decreases slightly when asymmetry factor increases from 1 to 10. This is because large asymmetry factor implies the traffic from any pair of nodes becomes more 'unidirectional'. New lightpaths are easier to find channels available in wavebands with the required transmission direction. Hence, the bandwidth utilization of a waveband will be improved when the asymmetry factor is large.

Note that the blocking performance of the reversible waveband approach can be further improved with other methods such as non-uniform waveband size. For example, we find that the reversible waveband approach with non-uniform waveband size of {2, 2, 2, 2, 4, 4, 8, 8} will have better performance than that of uniform waveband size of 4. Nevertheless, it will become another interesting optimization problem when the number of wavelength channels is large.

We observe that in the real world traffic between users are often asymmetric and network traffic patterns change frequently. More flexible bandwidth utilization is desired. We therefore propose reversible wavelength channels to be used in wavelength-routed (WR) networks. Reversible lanes in highway systems have already been widely regarded as of one of the most cost-effective methods to provide additional capacity for periodic unbalanced directional traffic demand while minimizing the total number of lanes on a roadway. However, reversible wavelength channels so far have not been demonstrated in WR networks even though we observe that most of the required technologies are already available. In the present invention, we demonstrate that the reversible wavelength channel approach can provide significant performance improvement for WR networks when the traffic is asymmetric. Even if the traffic is symmetric, we also have nontrivial performance improvement with the reversible wavelength channel approach, i.e., the blocking performance of WR networks with reversible wavelength channels will be similar to that of normal WR networks with double the number of fibers per link. Different implementation approaches for reversible wavelength channels are demonstrated. Among them, the performance of the reversible waveband approach has been discussed in detail.

Figure 15:
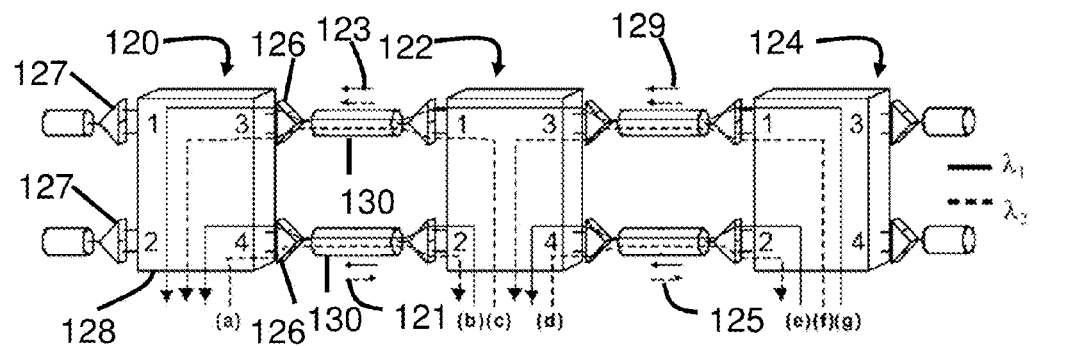
FIG. 15 shows three nodes of a WR network with reversibly configurable components, and also shows the optical signal streams' transmission directions in the WR network, in accordance with another embodiment of the present invention.
Figure 16:
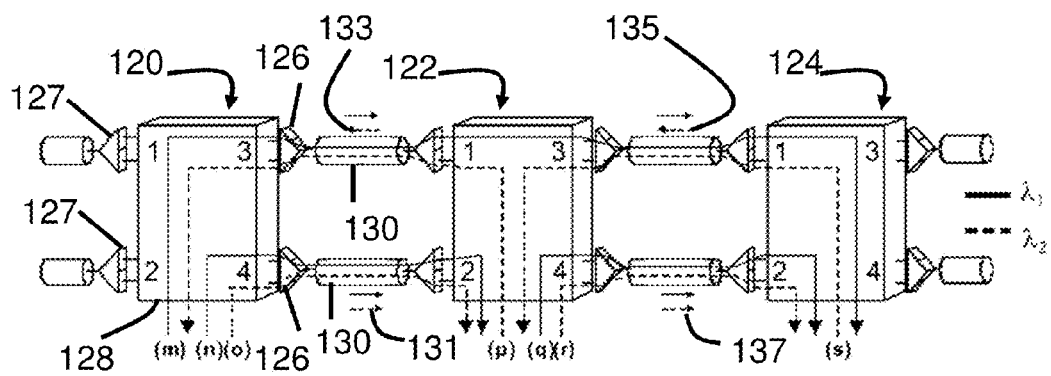
FIG. 16 shows the three nodes of a WR network in FIG. 15 with different flow directions of optical signal streams.

Turning now to FIGS. 15-16, which show reversible configurations of a WR network similar to that illustrated in FIG. 1, according to an embodiment of the present invention. There are three nodes 120, 122 and 124 shown in FIGS. 15-16, which are connected in a serial way. Each of the nodes 120, 122 and 124 is considered as a connection point since optical signal streams may enter/leave the WR network from any one of the nodes 120, 122 and 124. For each one of nodes 120, 122 and 124, it consists of an optical switch 128, and a plurality of MUX/DEMUX 126 and DEMUX/MUX 127 each configured on a port of the optical switch 128. For two adjacent nodes, they are connected by two optical fibers 130 through two ports of each node. The optical fibers 130 are used as the optical media for transmitting channel signals in this embodiment. Port 3 and 4 of node 120 are connected to Port 1 and 2 of node 122 by two optical fibers 130 respectively, and Port 3 and 4 of node 122 are connected to Port 1 and 2 of node 124 by two optical fibers 130 respectively. Note that optical switch 128, the optical fibers 130, the MUX/DEMUX 126 and DEMUX/MUX 127 are all bidirectional, meaning that they can manipulate optical signal transmission in two opposite directions simultaneously. Detailed structures of the optical switch 128, the optical fibers 130, and the MUX/DEMUX 126 and DEMUX/MUX 127 will be provided below.

Figure 17:
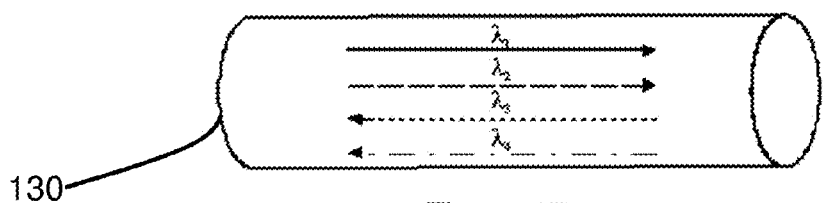
FIG. 17 illustrates an optical fiber used in the WR network in FIGS. 15 and 16.

FIG. 17 shows an example of a bidirectional optical fiber 130 suitable for using in the present invention with four optical signal streams, each with a dedicated associated wavelength (from $\lambda_1$ to $\lambda_4$). The multiple optical signal streams can be configured with the same or different transmission directions. This is achieved for example by dynamically changing an optical signal stream's transmission direction by the optical switches connected to two end of the optical fiber, so that transmission of signal from a first end of the optical fiber to a second end of the optical fiber can be changed to transmission of signal from the second end of the optical fiber to the first end of the optical fiber. Moreover, the optical fiber 130 supports simultaneous optical signal transmission on two opposite directions, and as shown in FIG. 17 both the forward signals with the wavelengths of $\lambda_1$ and $\lambda_2$, and backward signals with the wavelengths of $\lambda_3$ and $\lambda_4$, can be transmitted at the same time.

Figure 18A:
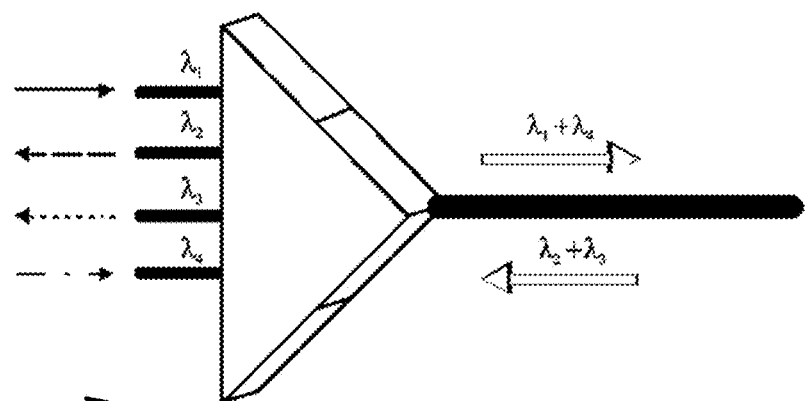
FIGS. 18a and 18b illustrate respectively the MUX/DEMUX and the DEMUX/MUX used in the WR network in FIGS. 15 and 16.
Figure 18B:
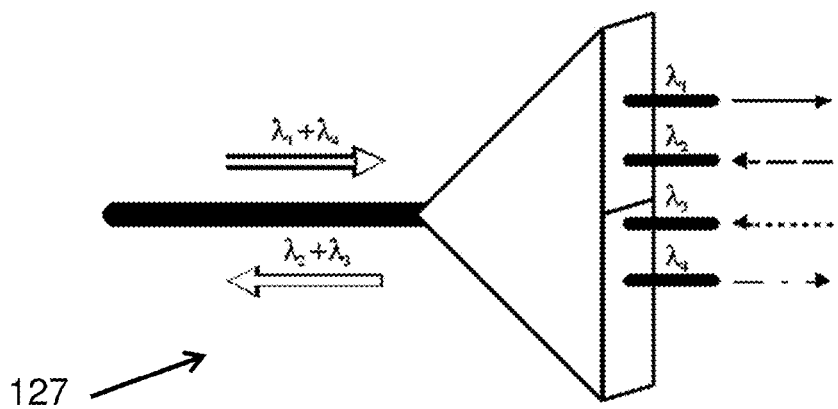

Next, FIGS. 18a and 18b illustrate examples of bidirectional MUX/DEMUX 126 and DEMUX/MUX 127 suitable for using in the WR network in the present invention with reversible configurations. As skilled persons would understand, a wavelength multiplexer (MUX) is an optical device to combine optical signal streams each with a dedicated wavelength into an optical signal stream with multiple wavelength components. On the contrary, a wavelength demultiplexer (DEMUX) is to separate the components of a composite optical signal stream according to their associated wavelengths to multiple optical signal streams. FIG. 18a shows a MUX/DEMUX 126 with four input ports and one output port. FIG. 18b shows a DEMUX/MUX 127 with one input port and four output ports. Note that although different names and parts have been assigned to the MUX/DEMUX 126 and DEMUX/MUX 127 in the context herein, the physical structures of the MUX/DEMUX 126 in FIG. 18a and DEMUX/MUX 127 in FIG. 18b are effectively the same, so they can be used interchangeably in a WR network. The first term used in the names of "MUX/DEMUX" and "DEMUX/MUX" is for indicating the primary function of the part, and the second term is for indicating the secondary function. Accordingly, for a MUX/DEMUX 126 its primary function is multiplexing, and for a DEMUX/MUX 127 its primary function is demultiplexing.

As shown in FIG. 18a, the input ports of the MUX/DEMUX 126 are wavelength selective. Only optical signal with $\lambda_i$ (i=1 to 4) can be sent into input port i (i=1 to 4) to get combined into the optical signal stream appearing at the output port of the MUX/DEMUX 126. This is the multiplexing operation in the MUX/DEMUX 126. Additionally, in the bidirectional MUX/DEMUX one can also send a composite optical signal from the output port of a MUX and obtain individual optical signals from the corresponding input ports according to the optical signal's associated wavelength (thus demultiplexing). For example, FIG. 18a shows a composite optical signal stream sent into the MUX/DEMUX 126 through the output port. The composite optical signal stream is composed of two optical signal streams with associated wavelengths $\lambda_2$ and $\lambda_3$. One can therefore retrieve the two separate optical signal streams with associated wavelengths $\lambda_2$ and $\lambda_3$ from two of the four input ports as shown in FIG. 18a.

Likewise, the bidirectional DEMUX/MUX 127 is also suitable for reversible configuration in a WR network where the reversed optical signal transmission can enter the output of the DEMUX/MUX 127. The output ports of the DEMUX/MUX 127 will be wavelength selective if they are used for optical signal inputting. FIG. 18b shows the example of reversible transmission of the DEMUX/MUX 127. In the figure, two optical signal streams with associated wavelengths $\lambda_2$ and $\lambda_3$ are sent into the corresponding two output ports of the DEMUX/MUX 127. Then, an optical signal stream with components of associated wavelengths $\lambda_2$ and $\lambda_3$ can be obtained from the input port of the DEMUX/MUX 127.

Figure 19:
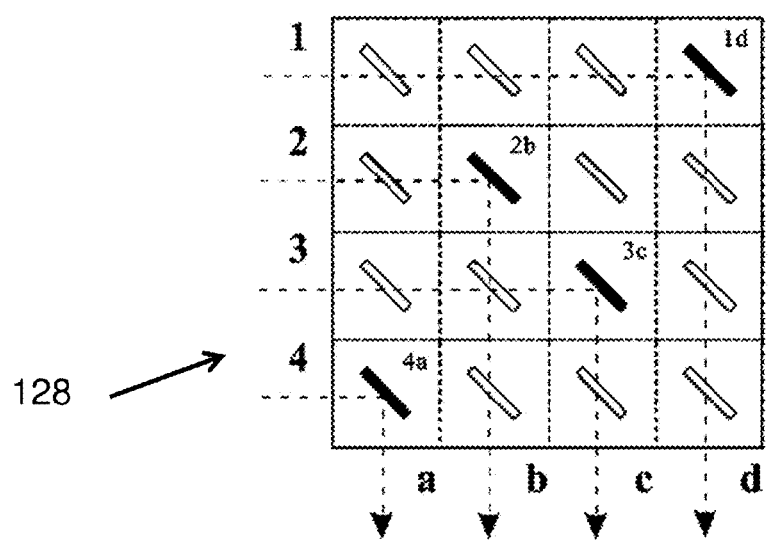
FIG. 19 shows the schematic diagram of the bidirectional switch used in the WR network in FIGS. 15 and 16.

Turning now to FIG. 19, an example of optical switch 128 suitable for using in the WR network in the present invention with a reversible configuration is illustrated. The optical switch 128 uses micro electro mechanical systems (MEMS) technology. FIG. 19 shows that the optical switch 128 is a four-by-four MEMS optical switch. The four optical signal streams enter the switch from the left side (indicated by 1, 2, 3 and 4). They are then reflected by the on-off mirrors (1d, 2b, 3c and 4a) to change the propagation direction at a right angle, and exit the switch 128 at the bottom side (indicated by a, b, c and d). The optical switch 128 being reversibly configurable that incoming optical signal streams could enter the bottom side (indicated by a, b, c and d), be reflected, and then output from the left side (indicated by 1, 2, 3 and 4).

TABLE 2

Required transmission bandwidth between nodes in wavelength channels

| destination source | Node 120 | Node 122 | Node 124 |
|---|---|---|---|
| Node 120 | 0 | 1 | 0 |
| Node 122 | 2 | 0 | 1 |
| Node 124 | 1 | 2 | 0 |

Returning back to FIGS. 15 and 16, the operations of the reversible configurations of the WR network will be now described. FIG. 15 shows the optical signal routes in the WR network when the traffic bandwidth requirement across the WR network is shown in Table 2. In Table 2, the unit of a bandwidth requirement in each cell of the table is a wavelength channel. Hence, Node 120 requires one wavelength channel transmission bandwidth at the transmission direction to Node 122. Node 122 requires transmission bandwidth of two wavelength channels at the transmission direction to Node 120, and that of one wavelength channel at the transmission direction to Node 124. Node 124 requires transmission bandwidth of three wavelength channels at the transmission direction to Node 122. Traditionally, the transmission bandwidth of two wavelength channels to a neighbor node is fixedly assigned to each node. Also, an optical fiber only has a limited number of wavelength channels, such as $\lambda_1$ and $\lambda_2$. Therefore, without applying the reversible configuration, Node 124 is unable to set up the required three lightpaths because only transmission bandwidth of two wavelength channels is available for the transmission direction from Node 122 to Node 120. Similarly, Node 122 may be unable to set up the required two lightpaths to Node 120 if the lightpath from Node 124 to Node 120 is considered.

However, with the reversible configuration of wavelength channels in the WR network, all lightpath requests will be granted if the transmission bandwidth has been assigned to nodes as shown in FIG. 15. In the new transmission bandwidth assignment, Node 120 has one wavelength channel transmission bandwidth (indicated by arrow 121) to Node 122, but three wavelength channels transmission bandwidth (indicated by arrows 123) from Node 122. The transmission bandwidth from Node 122 to Node 120 includes two wavelength channels reserved for the optical data streams from Node 122 to Node 120, and one wavelength channel reserved for the optical data stream from Node 124 to Node 120. Node 122 has one wavelength channel to Node 124 reserved for the optical data stream from Node 122 to Node 124 (indicated by arrow 125), but three wavelength channels from Node 124 (indicated by arrows 129). The transmission bandwidth from Node 124 to Node 122 includes two wavelength channels reserved for the optical data streams from Node 124 to Node 122, and one wavelength channel reserved for the optical data stream from Node 124 to Node 120.

TABLE 3

Required transmission bandwidth between nodes in wavelength channels

| destination source | Node 120 | Node 122 | Node 124 |
|---|---|---|---|
| Node 120 | 0 | 2 | 1 |
| Node 122 | 1 | 0 | 2 |
| Node 124 | 0 | 1 | 0 |

In comparison, the data transmission requirement in the WR network as shown in Table 3 requires a different reversible configuration compared to that in FIG. 15. This is illustrated in FIG. 16. In Table 3, the unit of a bandwidth requirement in each cell of the table is again a wavelength channel. Node 120 now requires two wavelength channel transmission bandwidth at the transmission direction to Node 122, and one wavelength channel transmission bandwidth at the transmission direction to Node 124. Node 122 requires transmission bandwidth of two wavelength channels at the transmission direction to Node 124, and that of one wavelength channel at the transmission direction to Node 120. Node 124 requires transmission bandwidth of two wavelength channels at the transmission direction to Node 122, and that of one wavelength channel at the transmission direction to Node 120. With the reversible configuration of wavelength channels in the WR network as illustrated in FIG. 16, all lightpath requests will be granted if the transmission bandwidth has been assigned to nodes. In the transmission bandwidth assignment, Node 120 has three wavelength channels transmission bandwidth (indicated by arrow 131) to Node 122, but only one wavelength channels transmission bandwidth (indicated by arrows 133) from Node 122. The transmission bandwidth from Node 120 to Node 122 includes two wavelength channels reserved for the optical data streams from Node 120 to Node 122, and one wavelength channel reserved for the optical data stream from Node 120 to Node 124. Node 122 has one wavelength channel from Node 124 reserved for the optical data stream from Node 124 to Node 122 (indicated by arrow 135), but three wavelength channels from Node 122 to Node 124 (indicated by arrows 137). The transmission bandwidth from Node 122 to Node 124 includes two wavelength channels reserved for the optical data streams from Node 122 to Node 124, and one wavelength channel reserved for the optical data stream from Node 120 to Node 124.

The essential components of the WR network as illustrated in FIGS. 15 and 16 have thus been described above. Since the optical switch 128, the optical fibers 130, and the MUX/DEMUX 126 and DEMUX/MUX 127 are all reversibly configurable, the terminal devices of the WR network can freely transmit optical signal streams between each other using one direction or another opposite direction according to the traffic requirement.

Figure 20:
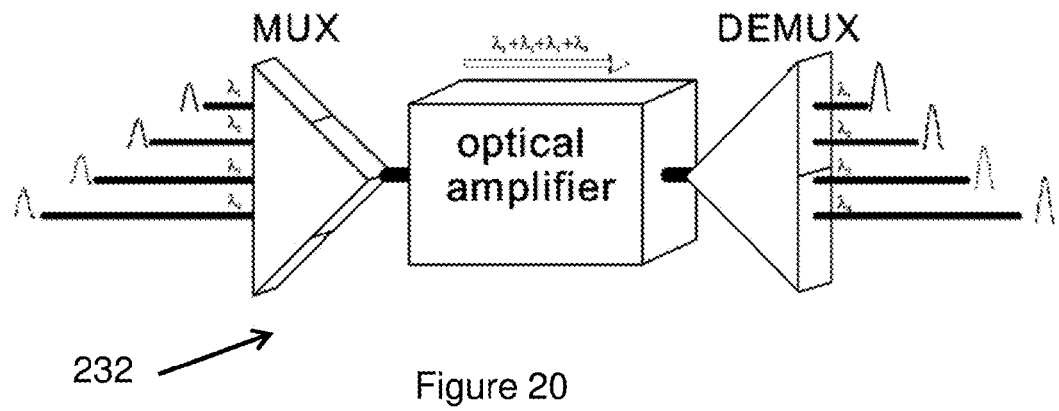
FIG. 20 shows an amplifier unit used in a bidirectional optical amplifier according to one embodiment of the present invention.
Figure 21:
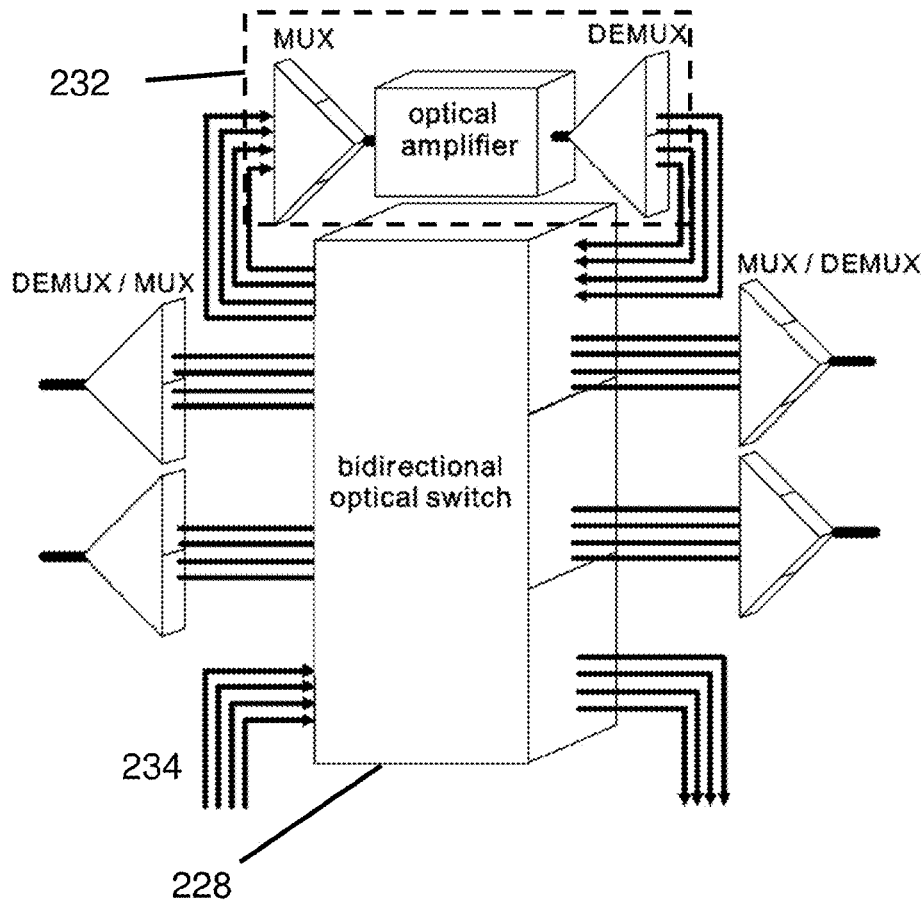
FIG. 21 shows a bidirectional optical amplifier according to one embodiment of the present invention which contains the amplifier unit in FIG. 20.

Next, some optional/preferable components in a reversibly configurable WR network will be described which would increase the performance of the WR network. Referring to FIGS. 20 and 21, which show a single-directional optical amplifier unit 232 and a bidirectional optical amplifier containing such optical amplifier unit 232 according to embodiments of the present invention respectively. As skilled persons would appreciate, in an optical fiber communication system optical amplification of optical signals will be preferably deployed if there is a long distance path between the source and destination nodes. FIG. 20 shows an example of optical amplifier unit 232 where optical signals to be amplified enter the MUX from the left side in the figure and outputted and amplified optical signals exit the DEMUX from the right side in the figure. Optical signals with different associated wavelengths ($\lambda_1$ to $\lambda_4$) can be amplified simultaneously through the optical amplifier unit 232 in FIG. 20. Typically, optical amplifiers are optimized for one transmission direction only.

In the bidirectional amplifier as shown in FIG. 21, the single-directional optical amplifier unit 232 is configured with a bidirectional optical switch 228 similar to that described above and shown in FIG. 19 to provide the bi-directional amplification to the optical signal streams in an optical fiber with different transmission directions, even if the optical amplifier unit itself 232 is optimized for only one transmission direction. Since the bi-directional optical switch 228 is used, optical signal streams from different transmission directions can all be routed to the input ports of the optical amplifier unit 232 by the internal switching of the bi-directional optical switch 228, and then rerouted to the desired output optical fibers after the optical amplification. In FIG. 21, the end users' data optical signal streams enter the node from the bottom (indicated by arrows 234) and are switched to the desired optical fibers by the bidirectional optical switch 228.

Figure 22:
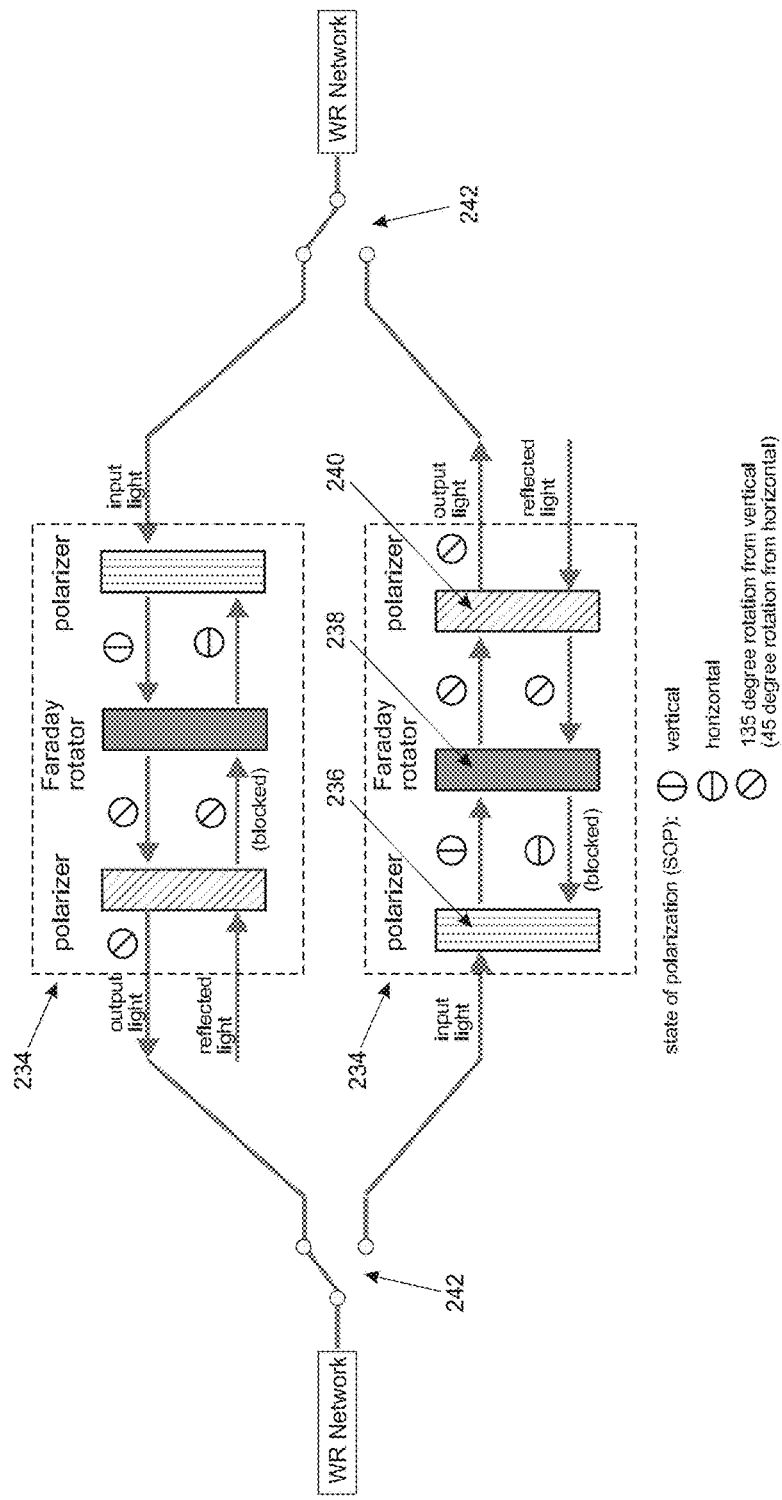
FIG. 22 shows a bidirectional optical isolator according to one embodiment of the present invention.

FIG. 22 shows the structure of a bidirectional optical isolator that can be used in the WR network in the present invention with a reversible configuration. To ensure the optical signal transmission quality, it is common that in an optical fiber the opposite transmission direction of an optical signal stream with associated wavelength $\lambda_x$ is banned to transmit another optical signal stream with the same associated wavelength $\lambda_x$. In spite of this, reflections can occur at the connecting interfaces of the optical components. Some optical signals with the same associated wavelength $\lambda_x$ can therefore appear at the opposition transmission direction of the specified optical signal stream. Optical isolators are generally used in optical fiber links to eliminate the optical signals caused by reflection. In the bidirectional optical isolator shown in FIG. 22, there are two identical single-directional isolator modules 234 which are connected by two switching device 242 at the two ends of the isolator modules 234 respectively. For each of the single-directional isolator modules 234, their working principle is the same. Taking the isolator module 234 on the bottom of FIG. 22 as an example, light incoming from the left side of the isolator module 234 is first filtered (polarized) by the left polarizer 236 such that only its vertical component can be sent to the Faraday rotator 238 which will further rotate the light's state of polarization (SOP) by 135 degrees. Then the light passes through the right polarizer 240 which only allows the passing of lights with SOP of 135 degree from the vertical. Finally, the light outputs from the isolator 234 module. On the contrary, a reflected light entering the same isolator module 234 from the right will firstly be polarized 135 degree from the vertical by the right polarizer 240 and then be rotated 135 degrees by the Faraday rotator 238 such that it becomes a light with horizontal SOP. Consequently, the light with horizontal SOP will be blocked by the left polarizer 236 which only allows passing of light with vertical SOP. Hence, an isolator module 234 can be used to prevent the reflected optical signals from degrading the transmission quality. The bidirectional isolator shown in FIG. 22 utilizes two isolator modules 234, which are selectively connected according to the transmission direction of optical signal stream into the bidirectional isolator. Only one isolator module 234 is used at a time which will be selected to connect to the two ports of the bidirectional isolator by the two switching devices 242. For example, if the optical signal stream comes from the left side in FIG. 22, then the bottom isolator module 234 will be connected by the two switching devices 242 and used for optical isolation. However, if the optical signal stream comes from the right side in FIG. 22, then the top isolator module 234 will be connected by the two switching devices 242 and used for optical isolation.

Figure 23:
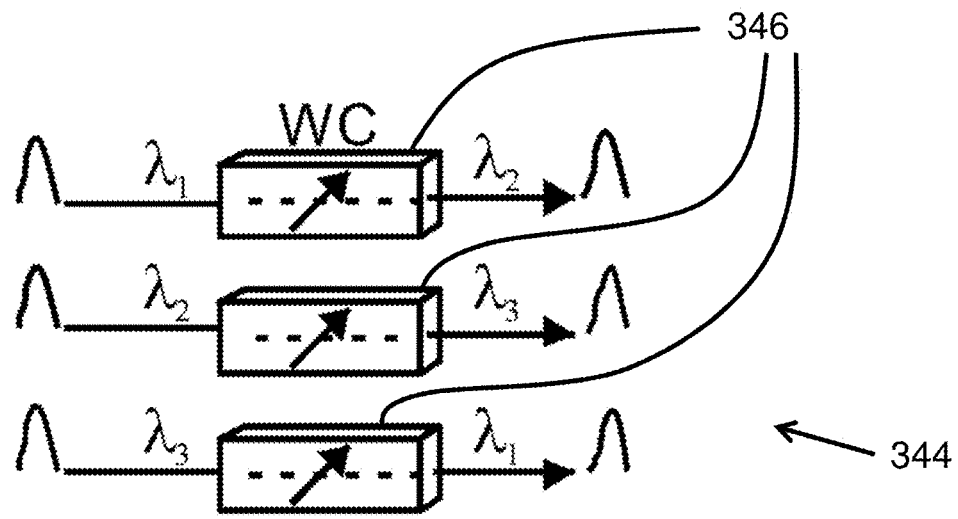
FIG. 23 shows a converter unit used in a bidirectional optical wavelength converter according to one embodiment of the present invention.
Figure 24:
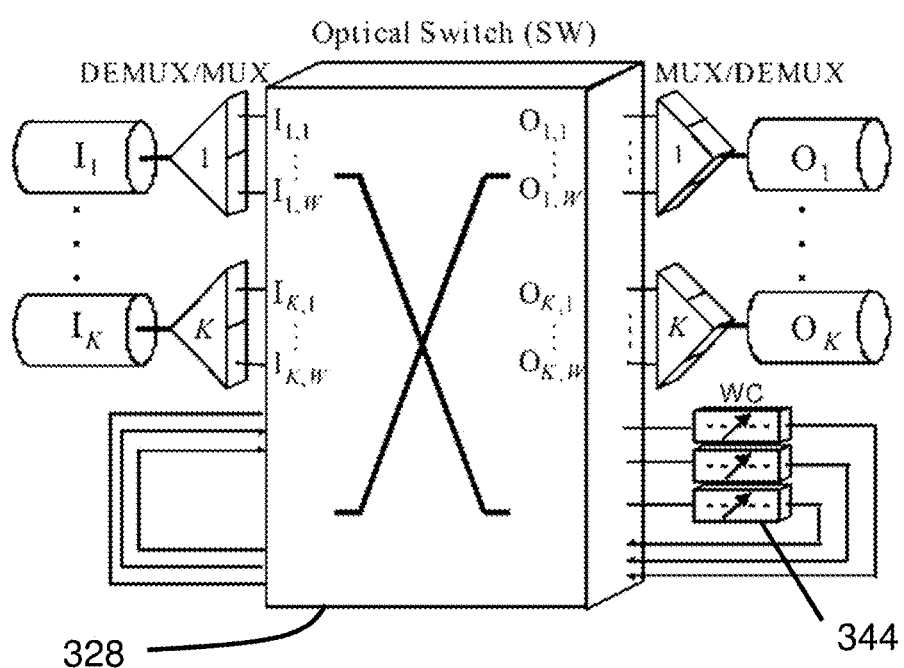
FIG. 24 shows a bidirectional optical wavelength converter according to one embodiment of the present invention which contains the converter unit in FIG. 23.
Figure 25:
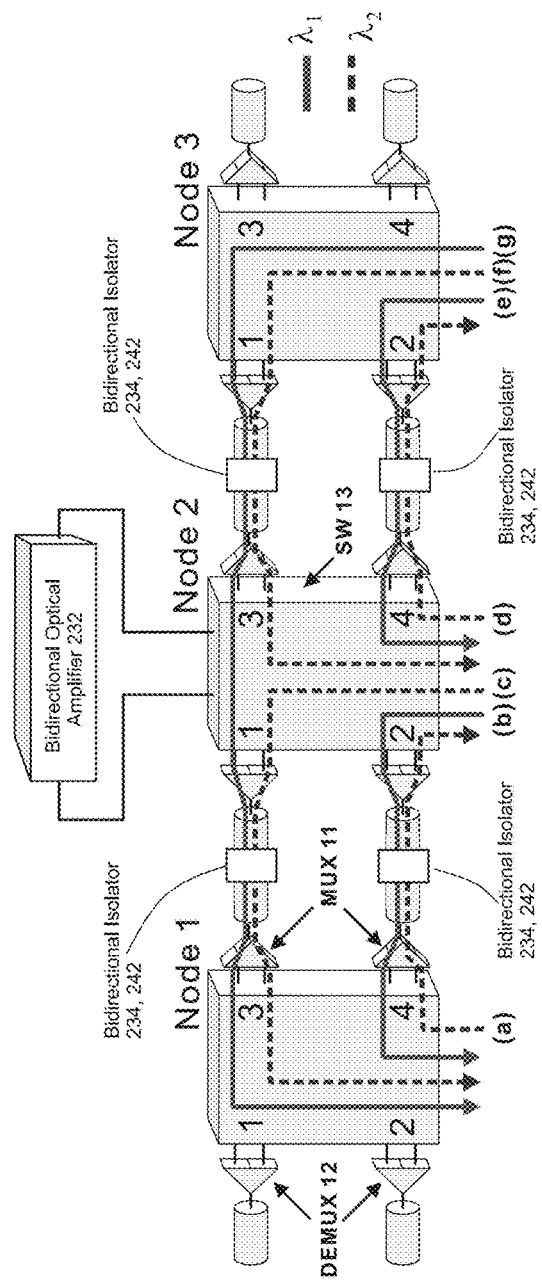
FIG. 25 shows three nodes of a WR network with the reversible wavelength channels with an optical amplifier in accordance with the present invention.
Figure 26:
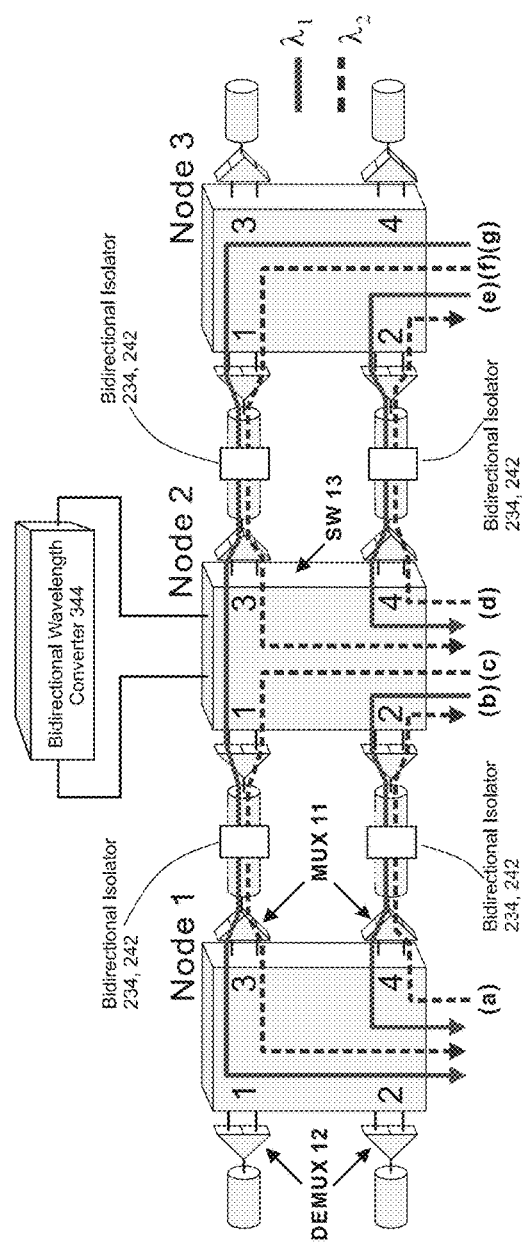
FIG. 26 shows three nodes of a WR network with the reversible wavelength channels with a bidirectional wavelength converter in accordance with the present invention.

Turning to FIGS. 23 and 24, a wavelength converter 344 and its configuration with a bidirectional optical switch 328 which could be used in the WR network in the present invention with a reversible configuration is shown. The wavelength converter 344 in FIG. 23 is consisted of three single-directional converter units 346 each has an input and an output. The wavelength converter is useful in some circumstances since two optical signal streams with the same associated wavelength cannot be transmitted on the same optical fiber, and wavelength converters are used to eliminate the wavelength conflict by converting the associated wavelength of one optical signal stream to a different wavelength value. For example, the three single-directional wavelength converter units 346 convert the optical signal streams with associated wavelengths $\lambda_1$, $\lambda_2$, and $\lambda_3$ to those with associated wavelengths $\lambda_2$, $\lambda_3$, and $\lambda_1$ respectively. The wavelength converter 344 is designed for one transmission direction only. In order to configure the wavelength converter to be reversibly configurable, it is coupled to an optical switch 328 similar to the case of the optical amplifier described above. Since the bi-directional optical switch 328 is used, optical signal streams from different transmission directions can all be routed to the input ports of the wavelength converter 344 by the internal switching of the bi-directional optical switch 328, and then rerouted to the desired output optical fibers after the wavelength conversion.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

In some variations of the embodiments described above, note that an end users' data optical signal stream may be obtained from the optical conversion of an electrically multiplexed signal of multiple low rate signal streams. Similarly, an end user may need to further electrically demultiplex the signals after optical-to-electrical converting the received optical signal streams. Hence, electrically multiplexing/demultiplexing facilities may be configured at the end user side in such cases.

Also, in the above exemplary embodiments, specific numbers of the optical fibers between two nodes, number of ports in the optical switches, number of nodes in a WR network, the available wavelength channels in an optical fiber, the capacity of dealing with optical signal streams DEMUX/MUX and MUX/DEMUX, the structure of the optical switch using MEMS, the structure of the optical isolator, the structure of the wavelength converter, and so on, are all provided for the sake of easy illustration of the these exemplary embodiments. Accordingly, one skilled in the art, without deviating from the spirit of the present invention, may take the freedom to change, supplement, or otherwise modify the specific structures of the WR network to be different from those illustrated above.

The invention claimed is:

1. An optical transmission system comprising:
 a first node of a wavelength-routed network including a bidirectional optical switch having a plurality of switch ports and a plurality of bidirectional optical multiplexers/demultiplexers coupled to a subset of the plurality of switch ports of the first node bidirectional optical switch, each of the plurality of first node bidirectional optical multiplexers/demultiplexers having a first node port;
 a second node of the wavelength-routed network including a bidirectional optical switch having a plurality of switch ports and a plurality of bidirectional optical multiplexers/demultiplexers coupled to a subset of the plurality of switch ports of the second node bidirectional optical switch, each of the plurality of second node bidirectional optical multiplexers/demultiplexers having a second node port;
 wherein one first node port corresponds with one second node port as a pair configured to be coupled with an optical media; and
 wherein the ports of the pair communicate with one another via a reversible channel signal which is transmitted via a channel in the optical media, and wherein the first node optical switch is configured to selectively transmit the reversible channel signal on the channel in a first direction from one or more of the first node bidirectional optical switch ports through one of the first node bidirectional optical multiplexers to its first node port being the port of the first node of the pair to the port of the second node of the pair and wherein the second node optical switch is configured to selectively transmit the reversible channel signal on the channel in a second direction from one or more of the second node bidirectional optical switch ports through one of the second node bidirectional optical multiplexers to its second node port being the port of the second node of the pair to the port of the first node of the pair;
 a bidirectional optical isolator for limiting reflection of said reversible channel signal, wherein the bidirectional optical isolator is coupleable with the optical media between the first and second nodes of the wavelength-routed network;
 wherein the transmission direction of the reversible channel signal transmitted via the channel is configurable between the first direction and the second direction by reconfiguring bidirectional components included in and between the first and second nodes including the first node bidirectional switch, the second node bidirectional switch, the first node bidirectional optical multiplexers/demultiplexers, the second node bidirectional optical multiplexers/demultiplexers, and the bidirectional optical isolator.

2. The optical transmission system according to claim 1, wherein each of the first node and second node are capable of multiplexing a plurality of input signals into said reversible channel signal which is a composite signal comprising components each corresponding to one said input signal.

3. The optical transmission system according to claim 1, wherein each of said first node and said second node are capable of demultiplexing said reversible channel signal into a plurality of output signals each of which corresponding to a component of said reversible channel signal.

4. The optical transmission system according to claim 1, wherein said bidirectional optical isolator further comprises two isolator modules, each connected to an input port and an output port of said bidirectional optical isolator by a switching device; said switching device configuring one of said two isolator modules to be used at one time depending on a transmission direction of said reversible channel signal.

5. The optical transmission system according to claim 1, wherein said optical media comprises a first set of one or more optical fibers between the first node and an intermediate node and further comprising a second set of one or more optical fibers between the intermediate node and the second node, and wherein said optical transmission system further comprises a bidirectional optical switch at the intermediate node, connected between the first node and the second node, and wherein another first node port corresponds with another second node port as another pair of ports configured to be coupled with an optical media configured for switching transmission of said reversible channel signal between said first set of one or more optical fibers and said second set of one or more optical fibers.

6. The optical transmission system according to claim 5, wherein said first node bidirectional optical switch, said second node bidirectional switch, and said intermediate node bidirectional optical switch are each micro electro mechanical systems (MEMS) switches containing a plurality of on-off mirrors.

7. The optical transmission system according to claim 5, further comprising a bidirectional optical amplifier for amplifying said reversible channel signal, wherein the bidirectional optical amplifier is configured with the bidirectional optical switch at the intermediate node that is coupled with the optical media between the first and second nodes.

8. The optical transmission system according to claim 7, wherein said bidirectional optical amplifier further comprises:
 a) a single-directional amplifier unit;
 b) a multiplexer with its output connected to an input of said single-directional amplifier unit;
 c) a demultiplexer with its input connected to an output port of said single-directional amplifier unit; and
 wherein an input of said multiplexer and an output of said demultiplexer being connected to the bidirectional optical switch at the intermediate node whereby said reversible channel signal is adapted to be switched by said bidirectional optical switch at the intermediate node to go through and be amplified by said single-directional amplifier unit.

9. The optical transmission system according to claim 5, further comprising a bidirectional optical wavelength converter coupled with the intermediate node bidirectional optical switch and wherein the optical wavelength converter is configured to convert a wavelength of the reversible channel signal.

10. The optical transmission system according to claim 9, wherein said bidirectional optical wavelength converter further comprises a single-directional converter unit; an input and an output of said converter unit connected to said intermediate node bidirectional optical switch whereby said reversible channel signal is adapted to be switched by said bidirectional optical switch to go through and be converted by said single-directional converter unit.

11. The optical transmission system according to claim 1, wherein said optical media is an optical fiber.

12. The optical transmission system according to claim 1, wherein said channel comprises at least one wavelength channel.

13. The optical transmission system according to claim 1, wherein said one optical media comprises a first set of one or more optical fibers between the first node and an intermediate node and further comprising a second set of one or more optical fibers between the intermediate node and the second node, an intermediate bidirectional amplifier for amplifying said reversible channel signal coupled with an intermediate node bidirectional optical switch for switching transmission of said reversible channel signal between said first set of one or more optical fibers and said second set of one or more optical fibers, and said channel comprises at least one wavelength channel, and wherein the intermediate bidirectional optical amplifier is coupled with the optical media between the first and second nodes through the intermediate node bidirectional switch.

14. The optical transmission system according to claim 1, wherein the first node of the pair transmits the reversible channel signal to the second node of the pair at a first moment in time and the second node of the pair transmits the reversible channel signal to the first node of the pair at a second moment in time.

15. The optical transmission system according to claim 1, wherein the optical media is an optical fiber which transmits the reversible channel signal in a first direction between the pair of the ports of the first and second node at a first moment in time and transmits the reversible channel signal in a second direction which is opposite to the first direction between the pair of the ports of the first and second nodes at a second moment in time.

16. A method of transmitting a reversible channel signal between a first node and a second node in a wavelength-routed network of an optical transmission system, the method comprising:

multiplexing a plurality of first input signals at the first node into the reversible channel signal;
transmitting at a first moment in time said reversible channel signal in a first direction via at least one channel in an optical media from the first node to the second node, whereby said reversible channel signal is adapted to be switched by a first node bidirectional optical switch to go through and be multiplexed into the at least one channel by said first node bidirectional optical multiplexer/demultiplexer;

demultiplexing said reversible channel signal at the second node into a plurality of first output signals;
multiplexing a plurality of second input signals at the second node into the reversible channel signal;
transmitting at a second moment in time said reversible channel signal in a second direction opposite to the first direction via the at least one channel in the optical media from the second node to the first node, whereby said reversible channel signal is adapted to be switched by a second node bidirectional optical switch to go through and be multiplexed into the at least one channel by said second node bidirectional optical multiplexer/demultiplexer; and
using the first node bidirectional optical multiplexer/demultiplexer, demultiplexing said reversible channel signal into a plurality of second output signals;
limiting reflection of said reversible channel signal by a bidirectional optical isolator coupleable with the optical media between the first and second nodes;
configuring the transmission direction of the reversible channel signal transmitted via the channel between the first direction and the second direction by reconfiguring bidirectional components included in and between the first and second nodes including the first node bidirectional optical switch, the second node bidirectional optical switch, the first node bidirectional optical multiplexers/demultiplexers, the second node bidirectional optical multiplexers/demultiplexers, and the bidirectional optical isolator.

17. The method of claim 16, wherein said bidirectional optical isolator further comprises two isolator modules, each connected to an input port and an output port of said bidirectional optical isolator by a switching device; said switching device configuring one of said two isolator modules to be used at one time depending on the transmission direction of said reversible channel signal.

18. The method of claim 16, wherein said optical media comprises a first set of one or more optical fibers between the first node and an intermediate node and further comprising a second set of one or more optical fibers between the intermediate node and the second node, and wherein said method further comprises transmitting said reversible channel signal in the first and second directions between said first set of one or more optical fibers and said second set of one or more optical fibers through an intermediate node bidirectional optical switch, connected between the first node and the second node.

19. The method of claim 18, further comprising amplifying said reversible channel signal by a bidirectional optical amplifier configured with said intermediate node bidirectional optical switch that is coupled with the optical media between the first and second nodes of the wavelength-routed network.

20. The method of claim 19, wherein said bidirectional optical amplifier further comprises:
a) a single-directional amplifier unit;
b) a multiplexer with its output connected to an input of said single-directional amplifier unit;
c) a demultiplexer with its input connected to an output port of said single-directional amplifier unit;
wherein an input of said multiplexer and an output of said demultiplexer being connected to a said intermediate node bidirectional optical switch whereby said reversible channel signal is adapted to be switched by said intermediate node bidirectional optical switch to go through and be amplified by said single-directional amplifier unit.

21. The method of claim 18, wherein said first node bidirectional optical switch, said second node bidirectional optical switch, and said intermediate node bidirectional optical switch are each is micro electro mechanical systems (MEMS) switches containing a plurality of on-off mirrors.

22. The method of claim 18, further comprising converting said reversible channel signal by an intermediate node bidirectional optical wavelength converter coupled with said intermediate node bidirectional optical switch, so that said reversible channel signal is adapted to be transmitted by said first set of one or more optical fibers and second set of one or more optical fibers.

23. The method of claim 22, wherein said intermediate node bidirectional optical wavelength converter further comprises a single-directional converter unit; an input and an output of said converter unit connected to said intermediate node bidirectional optical switch whereby said reversible channel signal is adapted to be switched by the intermediate node bidirectional optical switch to go through and be converted by said single-directional converter unit.

24. The method of claim 16, wherein said optical media comprises a first set of one or more optical fibers between the first node and an intermediate node and further comprising a second set of one or more optical fibers between the intermediate node and the second node, switching said reversible channel signal between said first set of one or more optical fibers and said second set of one or more optical fibers, and wavelength converting said reversible channel signal using an intermediate node wavelength converter coupled with an intermediate node bidirectional optical switch so that said reversible channel signal is adapted to be transmitted by said first set of one or more optical fibers and said second set of one or more optical fibers.

* * * * *

UNITED STATES PATENT AND TRADEMARK OFFICE
CERTIFICATE OF CORRECTION

PATENT NO. : 10,382,158 B2
APPLICATION NO. : 14/873047
DATED : August 13, 2019
INVENTOR(S) : Li et al.

It is certified that error appears in the above-identified patent and that said Letters Patent is hereby corrected as shown below:

Column 25, Claim 13, Line 39:
"intermediate node bidirectional switch."
Should be:
--intermediate note bidirectional optical switch--

Column 26, Claim 20, Line 62:
"demultiplexer being connected to a said intermediate"
Should be:
--demultiplexer being connected to said intermediate--

Column 27, Claim 21, Line 4:
"optical switch are each is micro electro mechanical systems"
Should be:
--optical switch are each micro electro mechanical systems--

Signed and Sealed this
Twenty-ninth Day of October, 2019

Andrei Iancu
*Director of the United States Patent and Trademark Office*